United States Patent

Hayashi et al.

Patent Number: 6,019,834
Date of Patent: Feb. 1, 2000

[54] PIGMENT, PROCESS FOR PRODUCING THE SAME AND PAINT USING THE SAME

[75] Inventors: Kazuyuki Hayashi; Mineko Ohsugi; Hiroko Morii, all of Hiroshima; Mamoru Kamigaki, Kure, all of Japan

[73] Assignee: Toda Kogyo Corporation, Japan

[21] Appl. No.: 09/035,054

[22] Filed: Mar. 5, 1998

[30] Foreign Application Priority Data

Mar. 6, 1997  [JP]  Japan ................................. 9-070672

[51] Int. Cl.$^7$ .............................. C09C 1/00; C09C 3/08; C09D 5/00

[52] U.S. Cl. .................... 106/499; 106/403; 106/414; 106/415; 106/419; 106/420; 106/421; 106/429; 106/432; 106/433; 106/447; 106/452; 106/453; 106/455; 106/458; 106/460; 106/471; 106/476; 106/480; 106/503; 427/214; 427/220; 428/403

[58] Field of Search ...................... 106/499, 505, 106/403, 414, 415, 419, 420, 421, 429, 432, 433, 447, 452, 453, 455, 458, 460, 471, 476, 480; 428/403; 427/214, 220

[56] References Cited

U.S. PATENT DOCUMENTS 5,686,012  11/1997  Hayashi et al. ....................... 252/62.56

FOREIGN PATENT DOCUMENTS

| | | |
|---|---|---|
| 4-92803 | 3/1992 | Japan . |
| 5-225552 | 9/1993 | Japan . |
| 5-225553 | 9/1993 | Japan . |
| 8-120191 | 5/1996 | Japan . |

Primary Examiner—Anthony Green
Attorney, Agent, or Firm—Nixon & Vanderhye

[57] ABSTRACT

A pigment of the present invention comprises:
  pigment particle as core particle;
  a lower coat formed on at least a part of surface of the pigment particle, comprising squaric acid, polyol having an anthraquinone skeleton represented by the general formula (I):

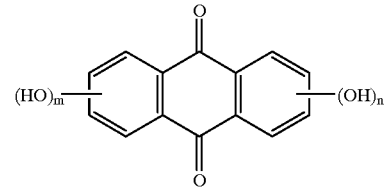

(I)

wherein m is an integer of 0 to 4, n is an integer of 0 to 4 and m+n is an integer of 2 to 4,
or a mixture of the squaric acid and the polyol having an anthraquinone skeleton represented by the general formula (I); and
  an upper coat formed on at least a part of surface of the obtained particle, comprising at least one alkylene glycol represented by the general formula (II):

$$C_qH_{2q}(OH)_2 \quad (II)$$

wherein q is an integer of 2 to 10.
Such pigment has excellent dispersion facility, dispersion homogeneity and dispersion stability, and is suitably used for not only organic solvent-type paints but also water-based paints.

10 Claims, No Drawings

PIGMENT, PROCESS FOR PRODUCING THE SAME AND PAINT USING THE SAME

BACKGROUND OF THE INVENTION

The present invention relates to a pigment, a process for producing the pigment and a paint using the pigment, and more particularly, relates to a pigment suitably used for not only organic solvent-type paints but also water-based paints and having excellent dispersion facility, dispersion homogeneity and dispersion stability, a process for producing the pigment, and a paint produced by using the pigment.

Hitherto, inorganic pigments have been used as coloring agents for paints by dispersing these pigments in vehicle, because they are excellent in chemical resistance, weather resistance or the like, and has a high stability.

In recent years, there is an increasing demand for high performance and high quality of coating films obtained by applying a paint on various substrates and drying the applied paint. In order to meet such a demand, there have been strongly required improvements in properties of the pigment which are considered the most influential factor on the qualities of the coating films such as brightness of color tone, tinting strength, brightness and gloss. Further, it has been required that the pigment used in the paint shows an excellent dispersion facility, dispersion homogeneity and dispersion stability in a vehicle for the paint.

This fact is pointed out, for instance, in "The Latest Technique for Pigment Dispersion", published by the Technical Information Society in 1993, on page 15: ". . . Pigment is never used singly and the pigment is always used after dispersed in a binder resin, solvent or other suitable material. The fine pigment particles need to be easily dispersible and also homogeneously dispersed in the binder for obtaining a clear color tone, high tinting strength and other desired performance. However, since the more the fine particles, the less the stability thereof becomes, it is a matter of great account to maintain stable dispersibility of the pigment particles. . . . ", and ". . . The properties required for the pigment may be defined and classified as follows from the various viewpoints. Dispersibility is classified as a matter that affects the physical properties, but the dispersibility also has close relation to and an influences the optical, chemical and specific functional properties. Namely, the improvement of dispersibility of the pigment for allowing uniform dispersion not only to mean enhancement of clearness of color tone, tinting strength, brightness and gloss of the coating films, but also to lead to improvement of chemical properties such as fastness, and workability. . . . "

Paints are divided into two types depending on the solvent used: organic solvent-type paints using an organic solvent as main solvent and water-based paints using water as main solvent.

In recent years, water-based paints have been considered favorable in terms of safety, hygiene and environmental protection, because the water-based paints have no serious atmospheric pollution problem, are more advantageous in saving of resource and energy, and also are easy to handle, thereby causing little risk of a fire.

However, since the dispersion mechanism of the pigment particles in a water-based paint is different from that in the conventional organic solvent-type paints, it is impossible to disperse the pigment particles in a vehicle by the same dispersion techniques as used for the organic solvent-type paints. An aqueous resin (color developer) is used in a water-based paint. Although an organic solvent-type resin (color developer) exists in a dissolved state with a certain spread, the aqueous resin exists mostly in the form of particles such as emulsion polymer particles or colloidal particles, resulting in difficulty in exhibiting steric hindrance effect of the resin, and therefore, deteriorated dispersibility of the pigment particles in the resin. Consequently, it becomes a problem how the pigment particles should be dispersed in the vehicle and how long it should take until effected, that is, dispersion facility and dispersion homogeneity of pigment particles becomes the problem of primary consideration. Further, the dispersion stability comes into problem since the pigment particles tend to reagglomerate due to interaction between dispersed pigment particles and the aqueous resin particles.

Therefore, it has been strongly required to provide pigment particles which can sufficiently function for not only the organic solvent-type paints but also the water-based paints, and are excellent in dispersion facility, dispersion homogeneity and dispersion stability.

Conventionally, in order to improve dispersibility of pigment particles in vehicle, it has been proposed to coat pigment particle surfaces with various kinds of inorganic or organic compounds.

For example, in Japanese Patent Application Laid-open (KOKAI) No. 5-225552(1993), there are described ferromagnetic metal fine particles whose surfaces are treated with 3,4-dihydroxy-3-cyclobutene-1,2-dione (squaric acid) as a 4-membered ring compound, and a magnetic recording medium using the particles. In Japanese Patent Application Laid-open (KOKAI) No. 5-225553(1993), there are described ferromagnetic metal fine particles whose surfaces are treated with aromatic organic acids having an anthraquinone skeleton such as alizarin, and a magnetic recording medium using the particles.

Also, in Japanese Patent Application Laid-open (KOKAI) No. 8-120191(1995) which corresponds to U.S. Pat. No. 5,686,012, there are described colored inorganic particles whose surfaces are coated with squaric acid and then with polysiloxane modified with polyether or the like.

In addition, various methods have been attempted to modify surfaces of the pigment particles with alcohol or the like. For instance, there have been proposed a method of imparting a lipophilic property to metal oxide particles by boiling the particles in alcohols having not more than 8 carbon atoms (Japanese Patent Application Laid-open (KOKAI) No. 48-100398(1973)), a method of improving the dispersibility of hydrophilic pigment particles by adding an aliphatic alcohol and non-polar solvent to the particles, and then heating the mixture while stirring to fix the alcohol on surfaces of the particles (Japanese Patent Application Laid-open (KOKAI) No. 49-97822(1974)), a method of surface-treating metal oxide particles by chemically bonding ethylene glycol or the like on surfaces of the metal oxide particles and then reacting unreacted alcoholic hydroxyl group of the ethylene glycol with an ethylenically unsaturated bond-containing compound (Japanese Patent Publication (KOKOKU) No. 57-1483(1982)), a method of surface-treating metal oxide particles by reacting the monovalent alcohol-treated particles with a polyvalent alcohol to conduct an ester exchange reaction therebetween (Japanese Patent Application Laid-open (KOKAI) No. 4-92803 (1992)), or the like.

Furthermore, there have been proposed inorganic pigment particles whose surfaces are coated with a surface active reaction product obtained by reacting a polyol having 3 to 4 hydroxyl groups and 3 to 7 carbon atoms such as trimethylol propane, with alkylene oxide in an amount of about 1 to about 5 moles per one hydroxyl group of the polyol (Japanese Patent Publication (KOKOKU) No. 53-18539 (1978)), or the like.

However, any of these conventional pigment particles cannot exhibit a sufficient dispersibility when used in water-based paints.

That is, the above-mentioned ferromagnetic metal fine particles described in Japanese Patent Applications Laid-open (KOKAI) Nos. 5-225552(1993) and 5-225553(1993) whose surfaces are treated with the squaric acid or the aromatic organic acid having an anthraquinone skeleton (such as alizarin) cannot exhibit a sufficient negative charging property when used as pigment particles in water-based paints.

The above-mentioned pigment particles described in Japanese Patent Application Laid-open (KOKAI) No. 8-120191(1995) have an upper coating layer comprising polysiloxane. Since the polysiloxane is a relatively expensive treating agent and since it is necessary to conduct the coating treatment at a high temperature due to a high molecular weight thereof, the pigment particles are disadvantageous from industrial viewpoints.

The pigment particles described in Japanese Patent Applications Laid-open (KOKAI) Nos. 48-100398(1973), 49-97822(1974) and 4-92803(1992) and Japanese Patent Publication (KOKOKU) No. 57-1483(1982) are surface-treated mainly for imparting a lipophilic property thereto such that the particles can be used in organic solvent-type paints. Therefore, when these particles are used in water-based paints, sufficient dispersibility of the particles therein cannot be achieved.

Further, the inorganic particles described in Japanese Patent Publication (KOKOKU) No. 53-18539(1988) are coated with the surface active reaction product to facilitate the dispersion of the particles in both aqueous and organic solvents. However, as described in Comparative Examples hereinafter, the inorganic particles cannot show a sufficient dispersibility in water-based paints.

In consequence, it has been still strongly demanded to provide pigment particles which can show excellent dispersion facility, dispersion homogeneity and dispersion stability when used in not only organic solvent-type paints but also water-based paints.

As a result of the present inventors' earnest studies, it has been found that by mixing pigment particles with squaric acid in water or alcohol as a dispersing solvent, followed by filtering and drying, to form a lower coat comprising squaric acid on at least a part of surface of the pigment particle, and then mixing the squaric acid-coated particles with at least one kind of alkylene glycol represented by the general formula: $C_nH_{2n}(OH)_2$, wherein n is an integer of 2 to 10, to form an upper coat comprising alkylene glycol on at least a part of the said coated pigment particle, the obtained particles can show excellent dispersion facility, dispersion homogeneity and dispersion stability in paints, especially in water-based paints. The present invention has been attained on the basis of this finding.

SUMMARY OF THE INVENTION

An object of the present invention is to provide a pigment which is excellent in dispersion facility, dispersion homogeneity and dispersion stability in paints, especially in a water-based paint.

It is another object of the present invention to provide a paint, especially a water-based paint which can show an excellent storage stability due to excellent dispersion facility, dispersion homogeneity and dispersion stability of pigment in a paint base material in addition to excellent brightness of color tone, tinting strength, brightness and gloss.

To accomplish the aim, in a first aspect of the present invention, there is provided a pigment comprising:

pigment particle as core particle;

a lower coat formed on at least a part of surface of the pigment particle, comprising (a) squaric acid, (b) polyol having an anthraquinone skeleton represented by the general formula (I):

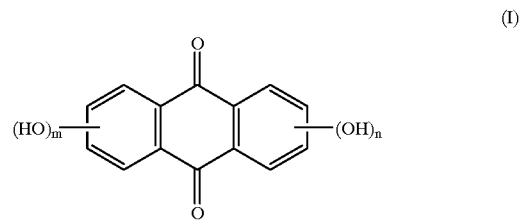

(I)

wherein m is an integer of 0 to 4, n is an integer of 0 to 4 and m+n is an integer of 2 to 4, or (c) a mixture of the squaric acid and the polyol having an anthraquinone skeleton represented by the general formula (I); and an upper coat formed on at least a part of surface of the obtained particle, comprising at least one alkylene glycol represented by the general formula (II):

$$C_qH_{2q}(OH)_2 \qquad (II)$$

wherein q is an integer of 2 to 10.

In a second aspect of the present invention, there is provided a paint comprising a paint base material and a pigment comprising:

pigment particle as core particle;

a lower coat formed on at least a part of surface of the pigment particle, comprising (a) squaric acid, (b) polyol having an anthraquinone skeleton represented by the general formula (I):

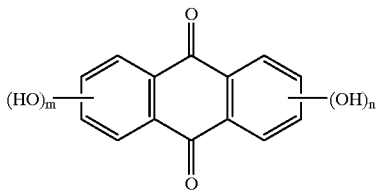

wherein m is an integer of 0 to 4, n is an integer of 0 to 4 and m+n is an integer of 2 to 4, or (c) a mixture of the squaric acid and the polyol having an anthraquinone skeleton represented by the general formula (I); and an upper coat formed on at least a part of surface of the obtained particle, comprising at least one alkylene glycol represented by the general formula (II):

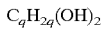

wherein q is an integer of 2 to 10.

In a third aspect of the present invention, there is provided a process for producing a pigment, comprising:

mixing as a dispersing solvent water or alcohol, pigment particles with squaric acid, polyol having an anthraquinone skeleton represented by the general formula (I):

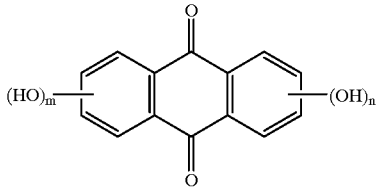

wherein m is an integer of 0 to 4, n is an integer of 0 to 4 and m+n is an integer of 2 to 4, or a mixture of squaric acid and polyol having an anthraquinone skeleton represented by the general formula (I), followed by filtering and drying, to form a lower coat comprising squaric acid, polyol having an anthraquinone skeleton represented by the general formula (I) or the mixture thereof on at least a part of surface of the pigment particle; and a second step of mixing the obtained pigment particles with at least one alkylene glycol represented by the general formula (II):

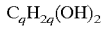

wherein q is an integer of 2 to 10, to form an upper coat comprising the alkylene glycol on at least a part of surface of the obtained particle.

DETAILED DESCRIPTION OF THE INVENTION

First, the pigment according to the present invention is described.

The pigment used as core particles in the present invention is composed of the following various known pigment particles.

Specific examples of the core pigment particles may include white pigment particles such as zinc white (ZnO), white lead ($2PbCO_3.Pb(OH)_2$), basic lead sulfate ($3PbSO_4.PbO\sim2PbSO_4.PbO$), lead sulfate ($PbSO_4$), lithopone ($ZnS+BaSO_4$), zinc sulfide (ZnS), titanium dioxide ($TiO_2$) and antimon oxide ($Sb_2O_3$); black pigment particles such as carbon black (C), graphite (C) and black iron oxide ($FeO_x.Fe_2O_3$ ($0<x\leq1$)); yellow pigment particles such as chrome yellow ($PbCrO_4$), zinc yellow ($ZnCrO_4$), barium chromate ($BaCrO_4$), cadmium yellow (CdS), yellow iron oxide hydroxide ($FeOOH.nH_2O$), ochre ($Fe_2O_3.SiO_2.Al_2O_3$), titan yellow ($TiO_2.NiO.Sb_2O_3$), lead cyanamide ($Pb(CN)_2$) and calcium plumbate ($Ca_2PbO_4$); orange pigment particles such as chrome orange ($PbCrO_4.PbO$) and chrome vermilion ($PbCrO_4.PbMoO_4.PbSO_4$); brown pigment particles such as brown iron oxide ($\gamma\text{-}Fe_2O_3$) and umber ($Fe_2O_3+MnO_2+Mn_3O_4$); red pigment particles such as red iron oxide ($\alpha\text{-}Fe_2O_3$), red lead ($Pb_3O_4$), vermilion (HgS), cadmium red (CdS+CdSe), cadmium mercury red (CdS+HgS) and antimony vermilion ($2Sb_2S_3.Sb_2O_3$ or $Sb_2S_3.Sb_2O_3$); violet pigment particles such as cobalt violet deep ($Co_3(PO_4)_2$, $Co_3(PO_4)_2. 8H_2O$), cobalt violet light ($Co_3(AsO_4)_2$, $Co_3(AsO_4)_2. 8H_2O$) and manganese violet ($Mn_2(PO_4)_3$, $(NH_4)_2Mn(P_2O_7)_2$); blue pigment particles such as ultramarine ($3NaAl.SiO_4.Na_2S_2$, $2(Na_2O.Al_2O_3.2SiO_2).Na_2S_2$), Prussian blue ($Fe_4[Fe(CN)_6]_3.nH_2O$), cobalt blue ($CoO.nAl_2O_3$ (n=2 to 3)) and cerulean blue ($CoO.nSnO_2.mMgO$ (n=1.5 to 3.5, m=2 to 6)); and green pigment particles such as chrome green (prussian blue +chrome yellow), zinc green (zinc yellow+prussian blue), chromium oxide green ($Cr_2O_3$), veridian ($Cr_2O(OH)_4$), emerald green ($Cu(CH_3CO_2)_2.3CuO(AsO_2)_2$) and cobalt green (CoO.ZnO.MgO).

Among these pigment particles, zinc white (ZnO), white lead ($2PbCO_3.Pb(OH)_2$), titanium dioxide ($TiO_2$), antimon oxide ($Sb_2O_3$), black iron oxide ($FeO_x.Fe_2O_3$ ($0<x\leq1$), chrome yellow ($PbCrO_4$), zinc yellow ($ZnCrO_4$), cadmium yellow (CdS), yellow iron oxide hydroxide ($FeOOH.nH_2O$), titan yellow ($TiO_2.NiO.Sb_2O_3$), chrome vermilion ($PbCrO_4.PbMoO_4.PbSO_4$), brown iron oxide ($\gamma\text{-}Fe_2O_3$), red iron oxide ($\alpha\text{-}Fe_2O_3$), cadmium red (CdS+CdSe), cadmium mercury red (CdS+HgS), cobalt blue ($CoO.nAl_2O_3$ (n=2 to 3)), chrome green (prussian blue+chrome yellow) and chromium oxide green ($Cr_2O_3$) are preferred, because the effect of the present invention can be effectively accomplished. Further, the iron oxide-based particles such as black iron oxide ($Fe^{2+}_xFe^{3+}_{(8-2x)/3}O_4$ ($0<x\leq1$), red iron oxide ($\alpha\text{-}Fe_2O_3$) and brown iron oxide ($\gamma\text{-}Fe_2O_3$), yellow iron oxide hydroxide ($FeOOH.nH_2O$), titanium dioxide ($TiO_2$), chrome yellow ($PbCrO_4$) and chromium oxide green ($Cr_2O_3$) are more preferred.

Especially, the iron oxide-based particles such as brown iron oxide ($\gamma\text{-}Fe_2O_3$), black iron oxide ($FeO_x.Fe_2O_3$ ($0<x\leq1$) and red iron oxide ($\alpha\text{-}Fe_2O_3$), and yellow iron oxide hydroxide ($FeOOH.nH_2O$) are even more preferred.

The above-mentioned various known pigment particles used as core particles in the present invention have an average particle diameter of usually 0.01 to 10 μm, preferably 0.1 to 3 μm, and may be of any suitable shape such as acicular shape, spindle-like shape, plate-like shape, spherical shape, cubic shape, octahedral shape or granular shape.

The BET specific surface area of these particles may be in the range of usually 0.1 to 80 m²/g, preferably 1 to 60 m²/g.

Especially, in the case of granular particles, the average particle diameter of the iron oxide-based particles or the yellow iron oxide hydroxide particles used in the present invention is usually 0.01 to 10 μm. In view of tinting strength and brightness, the average particle diameter thereof is preferably 0.05 to 3.0 μm, more preferably 0.1 to 0.5 μm.

In the case of acicular-like or spindle-like particles, the average major axial diameter of the iron oxide-based particles or the yellow iron oxide hydroxide particles is usually 0.05 to 20 μm and the average aspect ratio (average major axial diameter/average minor axial diameter) thereof is usually 2:1 to 20:1. In view of tinting strength and brightness, the average major axial diameter thereof is preferably 0.05 to 5.0 μm, more preferably 0.1 to 1.0 μm, and the average aspect ratio (average major axial diameter/ average minor axial diameter) thereof is preferably 2:1 to 15:1, more preferably 2:1 to 10:1.

In addition, in the case of plate-like particles, the average particle diameter (plate surface diameter) of the iron oxide-based particles or the yellow iron oxide hydroxide particles is usually 0.01 to 20.0 μm, and the average thickness thereof is usually 0.005 to 2.0 μm. In view of tinting strength and brightness, the average particle diameter (plate surface diameter) is preferably 0.05 to 15.0 μm, more preferably 0.1 to 10.0 μm, and the average thickness is preferably 0.007 to 1.5 μm, more preferably 0.01 to 1.0 μm.

The pigment according to the present invention comprises the above-mentioned various known pigment particles as core particles, a lower coat formed on surfaces of the core particles, comprising (a) squaric acid, (b) polyol having an anthraquinone skeleton or (c) both squaric acid and polyol having an anthraquinone skeleton, and an upper coat formed on the lower coat, comprising alkylene glycol.

The coating amount of the squaric acid on surfaces of the core particles is preferably 0.01 to 10% by weight (calculated as C), more preferably 0.02 to 5% by weight based on the total weight of the pigment. When the coating amount of the squaric acid is less than 0.01% by weight, the effect of fixing the upper coat comprising alkylene glycol thereon in the next step may not be sufficiently exhibited, thereby causing difficulty in producing the aimed pigment having an excellent dispersibility. On the other hand, when the coating amount of the squaric acid is more than 10% by weight, no further effect of increasing dispersibility of the pigment may not be expected because the effect is already saturated.

The coating amount of the polyol having an anthraquinone skeleton, on surfaces of the core particles is preferably 0.01 to 10% by weight (calculated as C), more preferably 0.02 to 5% by weight based on the total weight of the pigment. When the coating amount of the polyol having an anthraquinone skeleton is less than 0.01% by weight, the effect of fixing the upper coat comprising alkylene glycol thereon in the next step may not be sufficiently exhibited, thereby causing difficulty in producing the aimed pigment having an excellent dispersibility. On the other hand, when the coating amount of the polyol is more than 10% by weight, no further effect of increasing dispersibility of the pigment may not be expected because the effect is already saturated.

Further, in the case where the lower coat comprises both squaric acid and polyol having an anthraquinone skeleton, the total coating amount of the squaric acid and the polyol having an anthraquinone skeleton on the surfaces of the core particles is preferably 0.01 to 10% by weight (calculated as C), more preferably 0.02 to 5% by weight based on the total weight of the pigment.

The coating amount of the alkylene glycol on the lower coat is preferably 0.01 to 10% by weight (calculated as C), more preferably 0.02 to 5% by weight based on the total weight of the pigment. When the coating amount of the alkylene glycol is less than 0.01% by weight, it may become difficult to produce the aimed pigment having an excellent dispersibility. On the other hand, when the coating amount of the alkylene glycol is more than 10% by weight, no further effect of increasing dispersibility of the pigment may not be expected because the effect is already saturated.

The average particle diameter, shape and BET specific surface area of the pigment according to the present invention may be almost the same as those of the above-mentioned various known pigment particles used as the core particles.

The pigment according to the present invention is useful for not only an organic solvent-type paint but also a water-based paint. Especially, when the pigment is used in the water-based paint, there can be obtained a water-based paint having excellent coating properties.

As for the dispersibility of the pigment obtained by sequentially applying squaric acid as a lower coat and alkylene glycol represented by the general formula (II) as an upper coat on surfaces of core particles according to the present invention when used in a water-based paint, (i) in the case where red iron oxide particles are used as the core particles, the gloss of a coating film obtained by applying the paint on a substrate is not less than 82% when the dispersion time is 45 minutes and not less than 87% when the dispersion time is 90 minutes, with the absolute value of reduction percentage of the gloss being not more than 8%. (ii) In the case where yellow iron oxide hydroxide particles are used as the core particles, the gloss of the coating film is not less than 80% when the dispersion time is 45 minutes and not less than 85% when the dispersion time is 90 minutes, with the absolute value of reduction percentage of the gloss being not more than 10%. (iii) In the case where black iron oxide particles are used as the core particles, the gloss of the coating film is not less than 80% when the dispersion time is 45 minutes and not less than 85% when the dispersion time is 90 minutes, with the absolute value of reduction percentage of the gloss being not more than 10%. (iv) In the case where brown iron oxide particles are used as the core particles, the gloss of a coating film is not less than 80% when the dispersion time is 45 minutes and not less than 85% when the dispersion time is 90 minutes, with the absolute value of reduction percentage of the gloss being not more than 10%. The above-mentioned absolute value of reduction percentage of the gloss is measured by the method of the evaluation of the dispersion stability in the Examples.

As for the dispersibility of the pigment obtained by sequentially applying squaric acid as a lower coat and alkylene glycol represented by the general formula (II) as an upper coat on the surfaces of core particles according to the present invention when used in a water-based paint, in the case where pigment particles other than iron oxide particles and yellow iron oxide hydroxide particles are used as the core particles, the gloss of the coating film is not less than 75% when the dispersion time is 45 minutes and not less than 80% when the dispersion time is 90 minutes, with the absolute value of reduction percentage of the gloss being not more than 10%.

Alternatively, as for the dispersibility of the pigment obtained by sequentially applying squaric acid as a lower coat and alkylene glycol represented by the general formula (II) as an upper coat on the surfaces of core particles according to the present invention when used in an organic solvent-type paint, (i) in the case where red iron oxide particles are used as the core particles, the gloss of a coating film obtained by applying the paint on a substrate is not less than 82% when the dispersion time is 45 minutes and not less than 87% when the dispersion time is 90 minutes, with the absolute value of reduction percentage of the gloss being not more than 8%. (ii) In the case where yellow iron oxide hydroxide particles are used as the core particles, the gloss of the coating film is not less than 80% when the dispersion time is 45 minutes and not less than 85% when the dispersion time is 90 minutes, with the absolute value of reduction percentage of the gloss being not more than 10%. (iii) In the case where black iron oxide particles are used as the core particles, the gloss of the coating film is not less than 80% when the dispersion time is 45 minutes and not less than 85% when the dispersion time is 90 minutes, with the absolute value of reduction percentage of the gloss being not more than 10%. (iv) In the case where brown iron oxide particles are used as the core particles, the gloss of a coating film is not less than 80% when the dispersion time is 45 minutes and not less than 85% when the dispersion time is 90 minutes, with the absolute value of reduction percentage of the gloss being not more than 10%.

As for the dispersibility of the pigment obtained by sequentially applying squaric acid as a lower coat and alkylene glycol represented by the general formula (II) as an upper coat on the surfaces of core particles according to the present invention when used in an organic solvent-type paint, in the case where pigment particles other than iron oxide particles and yellow iron oxide hydroxide particles are used as the core particles, the gloss of the coating film is not less than 75% when the dispersion time is 45 minutes and not less than 80% when the dispersion time is 90 minutes, with the absolute value of reduction percentage of the gloss being not more than 10%.

As for the dispersibility of the pigment obtained by sequentially applying polyol having an anthraquinone skeleton represented by the general formula (I) as a lower coat and alkylene glycol represented by the general formula (II) as an upper coat on the surfaces of core particles according to the present invention when used in a water-based paint, (i) in the case where red iron oxide particles are used as the core particles, the gloss of a coating film obtained by applying the paint on a substrate is not less than 82% when the dispersion time is 45 minutes and not less than 87% when the dispersion time is 90 minutes, with the absolute value of reduction percentage of the gloss being not more than 8%. (ii) In the case where yellow iron oxide hydroxide particles are used as the core particles, the gloss of the coating film is not less than 80% when the dispersion time is 45 minutes and not less than 85% when the dispersion time is 90 minutes, with the absolute value of reduction percentage of the gloss being not more than 10%. (iii) In the case where black iron oxide particles are used as the core particles, the gloss of the coating film is not less than 80% when the dispersion time is 45 minutes and not less than 85% when the dispersion time is 90 minutes, with the absolute value of reduction percentage of the gloss being not more than 10%. (iv) In the case where brown iron oxide particles are used as the core particles, the gloss of the coating film is not less than 80% when the dispersion time is 45 minutes and not less than 85% when the dispersion time is 90 minutes, with the absolute value of reduction percentage of the gloss being not more than 10%.

As for the dispersibility of the pigment obtained by sequentially applying polyol having an anthraquinone skeleton represented by the general formula (I) as a lower coat and alkylene glycol represented by the general formula (II) as an upper coat on the surfaces of core particles according to the present invention when used in a water-based paint, in the case where pigment particles other than iron oxide particles and yellow iron oxide hydroxide particles are used as the core particles, the gloss of the coating film is not less than 75% when the dispersion time is 45 minutes and not less than 80% when the dispersion time is 90 minutes, with the absolute value of reduction percentage of the gloss being not more than 10%.

Alternatively, as for the dispersibility of the pigment obtained by sequentially applying polyol having an anthraquinone skeleton represented by the general formula (I) as a lower coat and alkylene glycol represented by the general formula (II) as an upper coat on the surfaces of core particles according to the present invention when used in an organic solvent-type paint, (i) in the case where red iron oxide particles are used as the core particles, the gloss of a coating film obtained by applying the paint on a substrate is not less than 82% when the dispersion time is 45 minutes and not less than 87% when the dispersion time is 90 minutes, with the absolute value of reduction percentage of the gloss being not more than 8%. (ii) In the case where yellow iron oxide hydroxide particles are used as the core particles, the gloss of the coating film is not less than 80% when the dispersion time is 45 minutes and not less than 85% when the dispersion time is 90 minutes, with the absolute value of reduction percentage of the gloss being not more than 10%. (iii) In the case where black iron oxide particles are used as the core particles, the gloss of the coating film is not less than 80% when the dispersion time is 45 minutes and not less than 85% when the dispersion time is 90 minutes, with the absolute value of reduction percentage of the gloss being not more than 10%. (iv) In the case where brown iron oxide particles are used as the core particles, the gloss of the coating film is not less than 80% when the dispersion time is 45 minutes and not less than 85% when the dispersion time is 90 minutes, with the absolute value of reduction percentage of the gloss being not more than 10%.

As for the dispersibility of the pigment obtained by sequentially applying polyol having an anthraquinone skeleton represented by the general formula (I) as a lower coat and alkylene glycol represented by the general formula (II) as an upper coat on the surfaces of core particles according to the present invention when used in an organic solvent-type paint, in the case where pigment particles other than iron oxide particles and yellow iron oxide hydroxide particles are used as the core particles, the gloss of the coating film is not less than 75% when the dispersion time is 45 minutes and not less than 80% when the dispersion time is 90 minutes, with the absolute value of reduction percentage of the gloss being not more than 10%.

As for the dispersibility of the pigment obtained by sequentially applying both squaric acid and polyol having an anthraquinone skeleton represented by the general formula (I) as a lower coat and alkylene glycol represented by the general formula (II) as an upper coat on the surfaces of core particles according to the present invention when used in a water-based paint, (i) in the case where red iron oxide particles are used as the core particles, the gloss of a coating film obtained by applying the paint on a substrate is not less than 85% when the dispersion time is 45 minutes and not less than 90% when the dispersion time is 90 minutes, with the absolute value of reduction percentage of the gloss being not more than 6%. (ii) In the case where yellow iron oxide hydroxide particles are used as the core particles, the gloss of the coating film is not less than 83% when the dispersion time is 45 minutes and not less than 88% when the dispersion time is 90 minutes, with the absolute value of reduction percentage of the gloss being not more than 8%. (iii) In the case where black iron oxide particles are used as the core particles, the gloss of the coating film is not less than 83% when the dispersion time is 45 minutes and not less than 88% when the dispersion time is 90 minutes, with the absolute value of reduction percentage of the gloss being not more than 8%. (iv) In the case where brown iron oxide particles are used as the core particles, the gloss of the coating film is not less than 83% when the dispersion time is 45 minutes and not less than 88% when the dispersion time is 90 minutes, with the absolute value of reduction percentage of the gloss being not more than 8%.

As for the dispersibility of the pigment obtained by sequentially applying both squaric acid and polyol having an anthraquinone skeleton represented by the general formula (I) as a lower coat and alkylene glycol represented by the general formula (II) as an upper coat on surfaces of core particles according to the present invention when used in a water-based paint, in the case where pigment particles other than iron oxide particles and yellow iron oxide hydroxide particles are used as the core particles, the gloss of the coating film is not less than 80% when the dispersion time is 45 minutes and not less than 85% when the dispersion time is 90 minutes, with the absolute value of reduction percentage of the gloss being not more than 8%.

Alternatively, as for the dispersibility of the pigment obtained by sequentially applying both squaric acid and polyol having an anthraquinone skeleton represented by the general formula (I) as a lower coat and alkylene glycol represented by the general formula (II) as an upper coat on the surfaces of core particles according to the present invention when used in an organic solvent-type paint, in the case where red iron oxide particles are used as the core particles, the gloss of a coating film obtained by applying the paint on a substrate is not less than 85% when the dispersion time is 45 minutes and not less than 90% when the dispersion time is 90 minutes, with the absolute value of reduction percentage of the gloss being not more than 6%. (ii) In the case where yellow iron oxide hydroxide particles are used as the core particles, the gloss of the coating film is not less than 83% when the dispersion time is 45 minutes and not less than 88% when the dispersion time is 90 minutes, with the absolute value of reduction percentage of the gloss being not more than 8%. (iii) In the case where black iron oxide particles are used as the core particles, the gloss of the coating film is not less than 83% when the dispersion time is 45 minutes and not less than 88% when the dispersion time is 90 minutes, with the absolute value of reduction percentage of the gloss being not more than 8%. (iv) In the case where brown iron oxide particles are used as the core particles, the gloss of the coating film is not less than 83% when the dispersion time is 45 minutes and not less than 88% when the dispersion time is 90 minutes, with the absolute value of reduction percentage of the gloss being not more than 8%.

As for the dispersibility of the pigment obtained by sequentially applying both squaric acid and polyol having an anthraquinone skeleton represented by the general formula (I) as a lower coat and alkylene glycol represented by the general formula (II) as an upper coat on the surfaces of core particles according to the present invention when used in an organic solvent-type paint, in the case where pigment particles other than iron oxide particles and yellow iron oxide hydroxide particles are used as the core particles, the gloss of the coating film is not less than 80% when the dispersion time is 45 minutes and not less than 85% when the dispersion time is 90 minutes, with the absolute value of reduction percentage of the gloss being not more than 8%.

Next, the process for producing the pigment according to the present invention is described.

The core particles to be treated according to the present invention may be selected from the above-mentioned various known pigment particles.

The squaric acid used in the present invention is not particularly restricted. For example, commercially available 3,4-dihydroxy-3-cyclobutene-1,2-dione (produced by TOKYO KASEI KOGYO CO., LTD.) can be used as the squaric acid.

When the surfaces of the pigment particles as core particles are coated with squaric acid, the pigment particles to be treated and squaric acid are mixed together in water or alcohol as a dispersing solvent, and then the mixture is sufficiently stirred to apply the squaric acid on the surfaces of the pigment particles, followed by filtering and drying, thereby obtaining a pigment composed of the pigment particles coated with squaric acid. When the pigment particles to be treated and squaric acid are mixed together, the order of addition of these coating components into water or alcohol is optional, namely any one of these coating components may be added in advance of the other, or both can be added simultaneously.

The squaric acid used in the present invention is usually maintained in a solid state at ordinary temperature. Upon coating, the squaric acid may be directly added, or may be added in the form of a solution prepared by previously dissolving it in water or alcohol. Preferably, squaric acid is added in the form of a solution.

In the case where the squaric acid is added in the form of a solution, the concentration thereof is usually 0.1 to 50 g/liter, preferably 0.5 to 10 g/liter.

The amount of the squaric acid added is 0.025 to 30.0% by weight, preferably 0.05 to 25.0% by weight based on the weight of the pigment particles to be treated. When the amount of squaric acid added is less than 0.025% by weight, the effect of fixing the upper coat comprising alkylene glycol on the lower coat comprising squaric acid in the next step becomes insufficient, thereby causing difficulty in producing the aimed pigment having an excellent dispersibility. On the other hand, when the amount of the squaric acid added is more than 30.0% by weight, no further effect cannot be expected because the effect is already saturated.

In the present invention, as the polyol having an anthraquinone skeleton, there may be used those polyols containing anthraquinone as a main skeleton and having 2 to 4 hydroxyl groups in total, which are represented by the general formula:

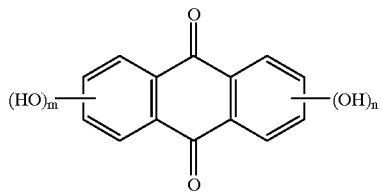

wherein m is an integer of 0 to 4, n is an integer of 0 to 4 and m+n is an integer of 2 to 4, Specific examples of the polyols having an anthraquinone skeleton may include alizarin (1,2-dihydroxyanthraquinone) represented by the formula:

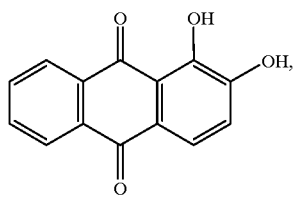

quinizarin (1,4-dihydroxyanthraquinone) represented by the formula:

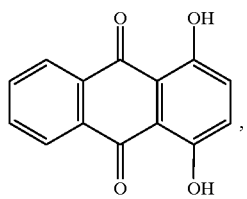

chrysazin (1,8-dihydroxyanthraquinone) represented by the formula:

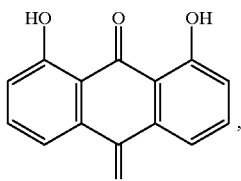

purpurin (1,2,4-trihydroxyanthraquinone) represented by the formula:

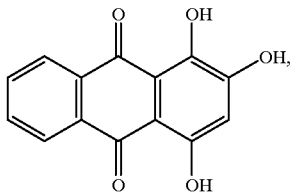

purpuroxanthin (1,3-dihydroxyanthraquinone) represented by the formula:

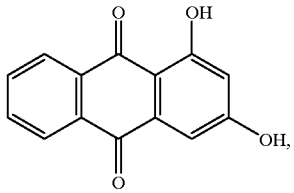

or the like.

When the surfaces of the pigment particles as core particles are coated with polyol having an anthraquinone skeleton represented by the general formula (I), the pigment particles to be treated and the polyol having an anthraquinone skeleton are mixed together in alcohol as a dispersing solvent and then the resultant mixture is sufficiently stirred, followed by filtering and drying, thereby obtaining pigment particles coated with polyol having an anthraquinone skeleton. Since the polyol having an anthraquinone skeleton is usually maintained in a solid state at ordinary temperature, it is preferred that the polyol having an anthraquinone skeleton be used in the form of a solution upon coating by previously dissolving it in alcohol such as ethanol.

The concentration of the solution containing the polyol having an anthraquinone skeleton, is usually 0.1 to 50 g/liter, preferably 0.5 to 10 g/liter.

The amount of the polyol having an anthraquinone skeleton added is 0.015 to 20.0% by weight, preferably 0.03 to 10.0% by weight based on the weight of the core pigment particles to be treated. When the amount of the polyol having an anthraquinone skeleton added is less than 0.015% by weight, the effect of fixing the upper coat comprising alkylene glycol on the lower coat comprising the polyol having an anthraquinone skeleton in the next step may become insufficient, thereby causing difficulty in producing the aimed pigment having an excellent dispersibility. On the other hand, when the amount of the polyol having an anthraquinone skeleton added is more than 20.0% by weight, no further effect of increasing the dispersibility may not be expected because the effect is already saturated.

Meanwhile, in the case where the core pigment particles are to be coated with both squaric acid and polyol having an anthraquinone skeleton represented by the general formula (I), the total amount of the squaric acid added and the polyol having an anthraquinone skeleton added, is preferably 0.015 to 30.0% by weight, more preferably 0.03 to 15% by weight based on the weight of the core pigment particles.

As the alkylene glycol used in the present invention, there may be exemplified those represented by the general formula of $C_nH_{2n}(OH)_2$, wherein n (carbon number) is an integer of 2 to 10.

Specific examples of the alkylene glycols may include ethylene glycol, propylene glycol, trimethylene glycol, butane diol, pentane diol, hexane diol, pinacol, heptane diol, octane diol, nonane diol, decane diol or the like. The carbon number of the alkylene glycol is preferably 2 to 7, more preferably 2 to 6. When the carbon number n is more than 11, the alkylene glycol may exhibit a high melting point, whereby there may arise such disadvantage that the treatment for uniformly coating the surfaces of the pigment particles with alkylene glycol must be conducted at a relatively high temperature.

The amount of the alkylene glycol added is usually 0.015 to 30% by weight, preferably 0.03 to 15% by weight based on the weight of the core pigment particles. When the amount of the alkylene glycol added is less than 0.015% by weight, the resultant coated particles may not exhibit a sufficient charging property, thereby causing difficulty in producing the aimed pigment having an excellent dispersibility. On the other hand, when the amount of the alkylene glycol added is more than 30% by weight, no further effect of increasing the dispersibility may not be obtained because the effect is already saturated.

The pigment particles coated with squaric acid, polyol having an anthraquinone skeleton or both thereof, can be further coated with the alkylene glycol only by mixing the coated pigment particles from the first coating step and the alkylene glycol together in a mixer under a dry mixing method.

Meanwhile, when the coated pigment particles from the first coating step is mixed with the alkylene glycol, it is preferred that the coated pigment particles is previously heated to a temperature of not less than 40° C., preferably not less than 60° C., more preferably 80 to 120° C. to adjust the water content thereof to not more than 0.5% by weight. When the water content in the coated pigment particles from the first coating step is too large, the coated pigment particles are forced to agglomerate with each other by the action of water crosslinked between the particles. Once such an agglomeration is caused, it may become difficult to uniformly coat individual pigment particles with alkylene glycol.

As the mixers used in the present invention for mixing the coated pigment particles from the first coating step and alkylene glycol with each other, there may be exemplified any mixers commonly used for this purpose, such as high-speed agitation-type mixer, Henschel mixer, speed mixer, ball cutter, power mixer, hybrid mixer or the like. Among them, Henschel mixer is preferably used to form a uniform coat comprising alkylene glycol on the surface of the coated pigment particles.

The temperature upon mixing or stirring is preferably not less than 40° C., more preferably not less than 60° C., and the upper limit thereof is not more than the boiling point of alkylene glycol used. It is preferred that the mixing is performed at a temperature of not less than 40° C. in order to reduce the viscosity of alkylene glycol used and form a uniform coat comprising alkylene glycol on the surfaces of the coated pigment particles.

The mixing or stirring time is usually at least 5 minutes, preferably not less than 10 minutes.

Next, the water-based paint according to the present invention is described.

The water-based paint according to the present invention is a paint prepared by using water as a main solvent, and therefore, includes both water-soluble paints and water-dispersion paints.

The water-dispersion paints may further include emulsion-type paints and colloidal dispersion-type paints.

The water-based paint according to the present invention comprises a paint base material and a pigment dispersed therein. The amount of the pigment dispersed may be in the range of 10 to 90 parts by weight based on 100 parts by weight of the paint base material. In view of handling of the obtained paint, the amount of the pigment dispersed is preferably in the range of 20 to 60 parts by weight, more preferably 30 to 50 parts by weight based on 100 parts by weight of the paint base material. When the shear rate D of the water-based paint is 1.92 $sec^{-1}$, the apparent viscosity of the water-based paint according to the present invention is preferably 100 to 3,000 cP, more preferably 300 to 2,000 cP.

The absolute value of zeta potential of the water-based paint according to the present invention is preferably not less than 10 mV, more preferably not less than 20 mV.

The storage stability of the water-based paint according to the present invention is preferably not less than 70%, more preferably not less than 75%.

Meanwhile, the pigment according to the present invention can also be suitably applied to organic solvent-type paints. In this case, the organic solvent-type paint is composed of a paint base material and a pigment dispersed therein. The amount of the pigment dispersed may be in the range of 10 to 90 parts by weight based on 100 parts by weight of the basic constituting material. In view of handling of the obtained organic solvent-type paint, the amount of the pigment dispersed is preferably 20 to 60 parts by weight, more preferably 30 to 50 parts by weight based on 100 parts by weight of the paint base material.

The paint base material may contain water, a resin, a solvent, and if required, extender pigment particles, a drying accelerator, a surfactant, a curing promoter, auxiliaries or the like.

The amount of the solvent used in the paint according to the present invention is preferably 50 to 5,000 parts by weight, more preferably 100 to 2,000 parts by weight based on 100 parts by weight of the resin. When the amount of the solvent is less than 50 parts by weight based on 100 parts by weight of the resin, the vehicle viscosity of the paint may become too high so that it is difficult to perform homogeneous mixing and dispersion. On the other hand, when the amount of the solvent is more than 5,000 parts by weight, the solvent content in the paint may increase to such an extent that the dispersing shear force does not act on the particles during mixing and dispersion.

The resins for water-based paints usable in the present invention may include those commonly used for this purpose, such as water-soluble alkyd resins, water-soluble acrylic resins, water-soluble urethane resins, water-soluble epoxy resins, water-soluble melamine resins, acrylic emulsion resin, acrylic styrene emulsion resins, urethane emulsion resins, epoxy emulsion resins, vinyl acetate emulsion resins or the like.

As the resins for organic solvent-type paints, there can be used those commonly used for this purpose, such as acrylic resins, alkyd resins, polyester resins, polyurethane resins, epoxy resins, phenol resins, melamine resins, amino resins or the like.

Examples of the solvents for water-based paints used in the present invention may include those commonly used for this purpose, such as water, butyl cellosolve, ethyl cellosolve, propylene glycol monomethyl ether, methyl cellosolve acetate, butoxyethyl acetate, ethoxyethanol, hexoxyethanol, methyl ethyl ketone, phenyl glycol ether, ethanol, butyl alcohol, butoxyethanol, propanol, propoxypropanol or the like.

As the solvents for organic solvent-type paints, there can be exemplified those commonly used for this purpose, such as toluene, xylene, butyl acetate, methyl acetate, methyl isobutyl ketone, butyl cellosolve, ethyl cellosolve, butyl alcohol, aliphatic hydrocarbons or the like.

As the defoaming agents used in the present invention, there may be exemplified commercially available products such as NOPCO 8034, SN DEFOAMER 477, SN DEFOAMER 5013, SN DEFOAMER 247, SN DEFOAMER 382 (tradenames: produced by SANNOPCO CO., LTD.), ANTIFOAM 08, EMULGEN 903 (tradenames: produced by KAO CO., LTD.) or BYK-020 (tradename: produced by BYK CO., LTD.).

In the water-based paints, there may also be used film-forming assistants such as alcohols or glycol ethers.

The emulsion-type paints can be prepared by adding a pigment, an additive, water and if necessary, an organic solvent to an emulsion resin. As the additives, there may be exemplified dispersant, rust preventive, defoaming agent, film-forming agent or the like. As the film-forming agents, there may be used higher alcohols, glycols and hydrocarbons.

The colloidal dispersion-type paints may be composed of a colloidal dispersion resin, a pigment, an additive, a neutralizer, water, an organic solvent or the like.

As the additives for the colloidal dispersion-type paints, there may be exemplified dispersant, defoaming agent, rust preventive or the like, i.e., the same additives as those for the emulsion-type paints except film-forming agent.

The water-based paints may be composed of a water-soluble resin, a pigment, an additive, water, an organic solvents or the like. As the additives for the water-based paints, there may be exemplified dispersant, defoaming agent, neutralizer, rust preventive or the like.

In addition, if required, the water-based paint may further contain extender pigment, aggregate, neutralizer, film-forming assistant, pigment dispersant, pigment wetting agent, thickener (viscosity-imparting agent), antiseptic agent, mildew proofing agent, antifreezing agent, rust preventive, dryer or the like.

The water-based paint according to the present invention can be produced by dispersing the pigment according to the present invention and the above-mentioned paint base material in specific weight ratios in water by a commonly used mixer such as ball mill, roll mill, homomixer, shaker, attritor or sand grinder.

The pigment according to the present invention, which has a lower coat formed on surface of the core particles, comprising squaric acid and/or polyol having an anthraquinone skeleton represented by the general formula (I) and an upper coat comprising alkylene glycol represented by the general formula (II), can be applied to both of the water-based paint and the organic solvent-type paint, and can exhibit excellent dispersion facility, dispersion homogeneity and dispersion stability, irrespective of type of the paint used.

The reason why the pigment according to the present invention can be effectively applied to both the water-based paint and organic solvent-type paint, is considered by the present inventors as follows.

That is, in the organic solvent-type paint, a resin is absorbed on the surfaces of the pigment particles with a spread, so that when the pigment particles approach each other, a large repulsion force, i.e., so-called steric hindrance effect, is produced by the absorbed resin so as to hinder the approach of the pigment particles to each other, thereby allowing the pigment particles to stay stably in the paint.

In the water-based paints, however, as described above, the resin exists in the form of particles without spread on the surfaces of the pigment particles, the steric hindrance effect observed with respect to the pigment particles in the organic solvent-type paints is unlikely to be achieved, thereby causing difficulty in dispersing the pigment particles in the water-based paint.

It is known that, generally, the higher the absolute value of zeta potential of suspended particles in a paint, the more excellent the dispersibility of the suspended particles due to electrostatic repulsion.

However, in the case of the coated pigment particles according to the present invention which has a lower coat formed on surface of the core particles, comprising squaric acid and/or polyol having an anthraquinone skeleton represented by the general formula (I) and an upper coat comprising alkylene glycol represented by the general formula (II), the zeta potential in the water-based paint is about $-20$ to $-100$ mV, especially about $-30$ to $-100$ mV, as described in Examples hereinafter, and the absolute value thereof is high, so that in the water-based paint, the surface of the particles tend to be charged negatively, thereby producing a large electrostatic repulsion between the particles. Due to the large electrostatic repulsion, agglomerated particles tend to be released from each other, and allowed to be dispersed in a state approximating that of the primary particles, thereby enabling the pigment to be dispersed in the water-based paint with excellent dispersion facility and dispersion homogeneity.

After once dispersed in a state close to the primary particles, the coated pigment particles can be maintained in such a dispersed state for a long period of time by the electrostatic repulsion between the particles, thereby ensuring excellent dispersion stability of the particles.

With respect to the bonding condition between squaric acid and the core pigment particles, for example, in Japanese Patent Application Laid-open (KOKAI) No. 5-225552 (1993), it is described that "It was confirmed that when the particles are treated with 3,4-dihydroxy-3-cyclobutene, water is produced by the treatment reaction. This indicates that the adsorption reaction between the treating agent and the surfaces of the ferromagnetic metal fine particles is accompanied with dehydration, and that the oxygen atom of hydroxyl group of the compound is directly bonded to the surfaces of the ferromagnetic metal fine particles (e.g., iron particles)."

In addition, since the pigment according to the present invention has the lower coat formed on the surfaces of the core particles, comprising squaric acid and/or polyol having an anthraquinone skeleton, the alkylene glycol upper coat can be firmly fixed on the particles due to the chemical bond between alkylene glycol and squaric acid and/or polyol having an anthraquinone skeleton.

Whereas, when only a single coat comprising squaric acid and/or polyol having an anthraquinone skeleton exists on the surfaces of the core particles, the absolute value of zeta potential is small as described in Comparative Examples 40 to 42 and 82 to 84 hereinafter, so that the pigment cannot be charged sufficiently and the dispersibility thereof becomes unsatisfactory.

Also, when only a single coat comprising alkylene glycol exists on the surfaces of the core particles, the alkylene glycol coat tends to be separated and peeled-off from the surfaces of the core particles as described in Comparative Examples 34 to 36 and 62 to 64 hereinafter, so that the pigment cannot be charged sufficiently and the dispersibility thereof becomes unsatisfactory.

Further, in the case where the order of application of the upper and lower coats is reversed, i.e., in the case where alkylene glycol is first applied onto the surfaces of the core particles to form a lower coat, the alkylene glycol lower coat is fallen-off together with an upper coat comprising squaric acid and/or polyol having an anthraquinone skeleton from the surfaces of the core particles as described in Comparative Examples 38 and 80 hereinafter, since the alkylene glycol has less bonding force to the surfaces of the core particles as described above. Thus, in such a case, the coats no longer exhibit their own functions, so that the pigment cannot be charged sufficiently and the dispersibility thereof becomes unsatisfactory.

As described in Examples hereinafter, in the case where squaric acid and polyol having an anthraquinone skeleton are used in combination to form a lower coat, the alkylene glycol upper coat is more stably fixed on the particles, so that the pigment can be more readily charged to a negative potential, and therefore, can show more excellent dispersion facility, dispersion homogeneity and dispersion stability.

Since the pigment according to the present invention shows excellent dispersion facility, dispersion homogeneity and dispersion stability in a paint, especially in a water-based paint, it is suitably used as pigment particles for paint.

Furthermore, the water-based paint according to the present invention can exhibit an excellent storage stability due to the fact that the pigment particles dispersed in a paint base material are excellent in dispersion facility, dispersion homogeneity and dispersion stability.

EXAMPLES

The present invention will now be described in more detail with reference to the following examples, but the present invention is not restricted to those examples and various modifications are possible within the scope of the invention.

(1) The average size (average diameter or average major axial diameter and the average minor axial diameter) of the particles are expressed by the average values of 350 particles measured in the photograph obtained by magnifying an electron micrograph (×30000) by 4 times in the vertical and horizontal directions, respectively. The aspect ratio is the ratio of the average major axial diameter and the average minor axial diameter.

(2) The coating amounts of squaric acid and polyol having an anthraquinone skeleton as a lower coat, and alkylene glycol as an upper coat were shown by the amount of carbon measured by using HORIBA METALLIC CARBON AND SULFUR ANALYZER EMIA-2200 (manufactured by HORIBA SEISAKUSHO CO., LTD.).

Incidentally, the coating amount of the alkylene glycol upper coat was shown by a calculated value obtained by subtracting the amount of carbon of the lower coat previously measured after the formation of the lower coat, from that of the upper coat measured after the formation of the upper coat.

(3) The viscosity of saint was determined by measuring a viscosity of a water-based paint prepared by mixing the obtained pigment particles with other paint components at specific weight ratios, at 25° C. and at a shear rate D of 1.92 sec$^{-1}$ by using E-type viscometer (cone plate-type viscometer) EMD-R (manufactured by TOKYO KEIKI CO., LTD.).

(4) The evaluations of dispersion facility, dispersion homogeneity and dispersion stability was shown in terms of gloss of a coating film as measured by a digital gloss meter UGV-5D (manufactured by SUGA SHIKENKI CO., LTD.) at an angle of incidence of 20°. The higher the gloss, the more excellent the dispersibility.

The dispersion facility was shown in terms of gloss of the coating film formed by applying a paint obtained by blending the specific paint components at the specific ratios shown below and dispersing a mill base therein for 45 minutes, on a cold rolled steel plate (0.8 mm×70 mm×150 mm) (JIS G 3141) to a coating thickness of 150 μm, followed by drying.

The dispersion homogeneity of the pigment was shown in terms of gloss of the coating film formed by applying a paint obtained by blending the specific paint components at the specific ratios shown below and dispersing a mill base therein for 90 minutes, on a cold rolled steel plate (0.8 mm×70 mm×150 mm) (JIS G 3141) to a coating thickness of 150 μm, followed by drying.

As for the dispersion stability of the pigment, a paint prepared by blending the specific components at the specific ratios shown below, dispersing a mill base therein for 90 minutes, and then diluting the resultant dispersion by adding thereto, in the case of an organic solvent-type paint, a solvent in an amount of 40% based on the organic solvent-type paint, and in the case of a water-based paint, water in an amount of 40% based on the weight of the water-based paint, was applied on a cold rolled steel plate (0.8 mm×70 mm×150 mm) (JIS G 3141) to a coating thickness of 150

μm, followed by drying to form a coat and its gloss was measured. The dispersion stability was shown by the absolute value of difference between glass of the coating film formed by applying a paint after dilution and that before dilution. The smaller the absolute value of the difference, the better the dispersion stability.

(5) The storage stability of a water-based saint was shown in terms of gloss of the coating film formed by applying a paint prepared by blending the specific components at the specific ratios shown below, dispersing a mill base therein for 90 minutes and allowing the preparation to stand for a day, on a cold rolled steel plate (0.8 mm×70 mm×150 mm) (JIS G 3141) to a coating thickness of 150 μm, followed by drying.

(6) The zeta potential of the coated pigment particles in the water-based paint was determined by a zeta potentiometer Model-501 (manufactured by PEN-KEM INC.) using a suspension prepared by adding 0.5 g of a paint which had been obtained by blending the specific components at the specific ratios shown below and dispersing a mill base therein for 90 minutes, to 100 g of pure water, and dispersing the paint by an ultrasonic disperser C-10 (manufactured by CHO-ONPA KOGYO CO., LTD.) for one minute.

Example 1
Production of Pigment 30 g of squaric acid (3,4-dihydroxy-3-cyclobutene-1,2-dione: produced by TOKYO KASEI KOGYO CO., LTD.) was added to 5 liter of pure water to prepare an aqueous squaric acid solution. The aqueous squaric acid solution was mixed with an additional amount of water to increase a total volume thereof to 25 liters, and stirred intimately. At this time, the concentration of squaric acid in the solution was 1.2 g/liter.

3.0 kg of granular red iron oxide particles ($\alpha$-$Fe_2O_3$) having an average particle diameter of 0.25 μm were gradually added to the aqueous squaric acid solution, and then mixed together while stirring for 30 minutes by a homomixer, followed by filtering and drying, thereby obtaining granular red iron oxide particles ($\alpha$-$Fe_2O_3$) whose surfaces were coated with squaric acid.

The coating amount of squaric acid on the surfaces of the granular red iron oxide particles ($\alpha$-$Fe_2O_3$) was 0.41% by weight calculated as carbon.

2.5 kg of the granular red iron oxide particles ($\alpha$-$Fe_2O_3$) whose surfaces were coated with squaric acid, was charged into a 10-liter Henschel mixer previously heated to 60° C., and mixed intimately by operating the mixer at 1,200 rpm for 10 minutes to remove water therefrom, thereby adjusting the water content of the coated granular red iron oxide particles to 0.19% by weight.

While the temperature of the Henschel mixer was maintained at 60° C., 25 g of propylene glycol (produced by YONEYAMA YAKUHIN CO., LTD.) (corresponding to 1.0% by weight based on the weight of the coated granular red iron oxide particles) was gradually added to the squaric acid-coated granular red iron oxide particles at a rate of 2.5 g/min for 10 minutes. Successively, the obtained mixture was mixed for 20 minutes to further coat the squaric acid-coated granular red iron oxide particles with propylene glycol.

Next, while continuing the mixing by the Henschel mixer, the resultant mixture was cooled to room temperature to form a coat of propylene glycol on the surfaces of the granular iron oxide particles coated with squaric acid. The coating amount of propylene glycol on the squaric acid-coated granular red iron oxide particles was 0.45% by weight (calculated as carbon) based on the total weight of the pigment.

Example 2
Production of Water-Based Paint

Using 7.62 g of the pigment comprising the coated granular red iron oxide particles obtained in Example 1, respective raw materials for mill base shown below were mixed with each other in such amounts (part by weight) as shown below in 140-ml glass container. The obtained mixture was further mixed and dispersed together with 90 g of 3 mmϕ glass beads in a paint shaker for 45 minutes to prepare a mill base.

Raw Materials for Mill base

Pigment (coated granular red iron iron oxide particles) 12.4 parts by weight

Water-soluble alkyd resin (tradename: S-118, produced by DAI-NIPPON INK KAGAKU KOGYO CO., LTD.) 9.0 parts by weight Defoaming agent 0.1 part by weight Water 4.8 parts by weight Butyl cellosolve 4.1 parts by weight Using the obtained mill base, respective raw materials for paint shown below were mixed with each other in such amounts (part by weight) as shown below, and further mixed and dispersed in a paint shaker for 15 minutes to obtain a water-based paint.

Raw Materials for Paint

Mill base obtained above 30.4 parts by weight

Water-soluble alkyd resin (tradename: S-118, produced by DAI-NIPPON INK KAGAKU KOGYO CO., LTD.) 46.2 parts by weight Water-soluble melamine resin (tradename: S-695, produced by DAI-NIPPON INK KAGAKU KOGYO CO., LTD.) 12.6 part by weight Defoaming agent (tradename: NOPCO 8034, produced by SUNNOPCO CO., LTD.) 0.1 part by weight Water 9.1 parts by weight Butyl cellosolve 1.6 parts by weight The obtained water-based paint had a paint viscosity of 1,075 cP, and the gloss of a coating film formed by using the paint was 86% when the dispersion time of the mill base was 45 minutes, and the gross thereof was 90% when the dispersion time of the mill base was 90 minutes, with the average value of reduction percentage of the gloss being 6%.

Further, the water-based paint showed a storage stability of 81% and a zeta potential of −35.7 mV.

Example 3
Production of Organic Solvent-type Paint

Using 10 g of the pigment comprising the coated red iron oxide particles obtained in Example 1, respective raw materials for mill base shown below were mixed with each other in such amounts (part by weight) as shown below in 140-ml glass container. The obtained mixture was further mixed and dispersed together with 90 g of 3 mmϕ glass beads in a paint shaker for 45 minutes or for 90 minutes to prepare a mill base.

Raw Materials for Mill base

Pigment (coated granular red iron oxide particles) 12.2 parts by weight

Aminoalkyd resin (tradename: AMILAC NO. 1026, produced by KANSAI PAINT CO., LTD.) 19.5 parts by weight Thinner 7.3 parts by weight Using the thus obtained mill base, respective raw materials for paint shown below were mixed with each other in such amounts (part by weight) as shown below, and further mixed and dispersed in a paint shaker for 15 minutes to obtain an organic solvent-type paint.

Raw Materials for Paint

Mill base obtained above 39.0 parts by weight

Aminoalkyd resin (tradename: AMILAC NO. 1026, produced by KANSAI PAINT CO., LTD.) 61.0 parts by weight The obtained organic solvent-type paint had a paint viscosity of 870 cP, and the gloss of a coating film formed by using the paint was 88% when the dispersion time of the mill base was 45 minutes and the gross thereof was 92% when the dispersion time of the mill base was 90 minutes, with the average value of reduction percentage of the gloss being 6%.

Examples 4 to 15 and Comparative Examples 1 to 14

Production of Pigment Using Iron Oxide-Based Particles

The same procedure as defined in Example 1 was conducted except that kind and amount of iron oxide-based particles or iron oxide hydroxide particles to be treated, coating amount of squaric acid, kind and coating amount of polyol having an anthraquinone skeleton, kind and coating amount of alkylene glycol, and mixing temperatures therefor were varied as shown in Tables 1 and 2, thereby producing coated iron oxide-based particles or coated iron oxide hydroxide particles as pigments. Various conditions used for the production of the pigments are shown in Tables 1 and 2.

TABLE 1

| | Coating treatment Particles to be treated | | |
| --- | --- | --- | --- |
| Examples | Kind | Shape | Major axial diameter (μm) |
| Example 4 | Red iron oxide | Granular | 0.21 |
| Example 5 | Red iron oxide | Granular | 0.21 |
| Example 6 | Red iron oxide | Granular | 0.15 |
| Example 7 | Yellow iron oxide hydroxide | Acicular | 0.40 |
| Example 8 | Black iron oxide | Granular | 0.32 |
| Example 9 | Brown iron oxide | Granular | 0.28 |
| Example 10 | Red iron oxide | Granular | 0.21 |
| Example 11 | Red iron oxide | Granular | 0.21 |
| Example 12 | Red iron oxide | Granular | 0.15 |
| Example 13 | Yellow iron oxide hydroxide | Acicular | 0.40 |
| Example 14 | Black iron oxide | Granular | 0.32 |
| Example 15 | Brown iron oxide | Granular | 0.28 |

| | Coating treatment Particles to be treated | | |
| --- | --- | --- | --- |
| Examples | Minor axial diameter (μm) | BET specific surface area (m²/g) | Amount (kg) |
| Example 4 | — | 8.3 | 2.5 |
| Example 5 | — | 8.3 | 2.5 |
| Example 6 | — | 12.1 | 2.0 |
| Example 7 | 0.08 | 17.6 | 2.0 |
| Example 8 | — | 4.9 | 2.5 |
| Example 9 | — | 6.1 | 2.5 |
| Example 10 | — | 8.3 | 2.5 |
| Example 11 | — | 8.3 | 2.5 |
| Example 12 | — | 12.1 | 2.0 |
| Example 13 | 0.08 | 17.6 | 2.0 |
| Example 14 | — | 4.9 | 2.5 |
| Example 15 | — | 6.1 | 2.5 |

| | Coating treatment Coating of lower layer | | | | |
| --- | --- | --- | --- | --- | --- |
| | Heat treatment before coating | | Amount of | Polyol having anthraquinone skeleton | |
| Examples | Temp. (° C.) | Residual water content (%) | squaric acid added (wt %) | Kind | Amount added (wt %) |
| Example 4 | 60 | 0.19 | 1.5 | — | — |
| Example 5 | 40 | 0.34 | 1.0 | — | — |
| Example 6 | 80 | 0.10 | 3.0 | — | — |
| Example 7 | 80 | 0.16 | 5.0 | — | — |
| Example 8 | 60 | 0.26 | — | Alizarin | 1.0 |
| Example 9 | 40 | 0.15 | — | Alizarin | 1.0 |
| Example 10 | 60 | 0.13 | — | Alizarin | 0.5 |
| Example 11 | 40 | 0.21 | — | Alizarin | 3.0 |
| Example 12 | 60 | 0.18 | 0.5 | Alizarin | 1.5 |
| Example 13 | 50 | 0.46 | 1.5 | Alizarin | 0.5 |
| Example 14 | 60 | 0.20 | 1.0 | Alizarin | 1.0 |
| Example 15 | 80 | 0.11 | 2.0 | Chrysazin | 2.0 |

| | Coating treatment Coating of upper layer Alkylene glycol | | |
| --- | --- | --- | --- |
| Examples | Kind | Amount added (wt %) | Mixing temperature (° C.) |
| Example 4 | Propylene glycol | 1.5 | 60 |
| Example 5 | Propylene glycol | 2.0 | 60 |
| Example 6 | Propylene glycol | 5.0 | 80 |
| Example 7 | Propylene glycol | 0.5 | 80 |
| Example 8 | Propylene glycol | 1.5 | 60 |
| Example 9 | 1,5-pentane diol | 2.0 | 40 |
| Example 10 | 1,5-pentane diol | 0.5 | 80 |
| Example 11 | Propylene glycol | 0.2 | 60 |
| Example 12 | Propylene glycol | 1.5 | 65 |
| Example 13 | 1,4-butane diol | 3.0 | 40 |
| Example 14 | 1,4-butane diol | 1.8 | 65 |
| Example 15 | Propylene glycol | 2.5 | 80 |

TABLE 2

| | Coating treatment Particles to be treated | | |
| --- | --- | --- | --- |
| Comparative Examples | Kind | Shape | Major axial diameter (μm) |
| Comparative Example 1 | Red iron oxide | Granular | 0.21 |
| Comparative Example 2 | Red iron oxide | Granular | 0.15 |
| Comparative Example 3 | Yellow iron oxide hydroxide | Acicular | 0.40 |

TABLE 2-continued

| Comparative Examples | Particles to be treated | | |
|---|---|---|---|
| Comparative Example 4 | Black iron oxide | Granular | 0.32 |
| Comparative Example 5 | Brown iron oxide | Granular | 0.28 |
| Comparative Example 6 | Red iron oxide | Granular | 0.21 |
| Comparative Example 7 | Red iron oxide | Granular | 0.21 |
| Comparative Example 8 | Red iron oxide | Granular | 0.21 |
| Comparative Example 9 | Red iron oxide | Granular | 0.21 |
| Comparative Example 10 | Red iron oxide | Granular | 0.21 |
| Comparative Example 11 | Red iron oxide | Granular | 0.21 |
| Comparative Example 12 | Red iron oxide | Granular | 0.21 |
| Comparative Example 13 | Red iron oxide | Granular | 0.21 |
| Comparative Example 14 | Red iron oxide | Granular | 0.21 |

| Comparative Examples | Coating treatment Particles to be treated | | |
|---|---|---|---|
| | Minor axial diameter ($\mu$m) | BET specific surface area ($m^2$/g) | Amount (kg) |
| Comparative Example 1 | — | 8.3 | — |
| Comparative Example 2 | — | 12.1 | — |
| Comparative Example 3 | 0.08 | 17.6 | — |
| Comparative Example 4 | — | 4.9 | — |
| Comparative Example 5 | — | 6.1 | — |
| Comparative Example 6 | — | 8.3 | 2.5 |
| Comparative Example 7 | — | 8.3 | 2.5 |
| Comparative Example 8 | — | 8.3 | 2.5 |
| Comparative Example 9 | — | 8.3 | 2.5 |
| Comparative Example 10 | — | 8.3 | 2.5 |
| Comparative Example 11 | — | 8.3 | 2.5 |
| Comparative Example 12 | — | 8.3 | 2.5 |
| Comparative Example 13 | — | 8.3 | 2.5 |
| Comparative Example 14 | — | 8.3 | 2.5 |

| Comparative Examples | Coating treatment Coating of lower layer | | | | |
|---|---|---|---|---|---|
| | Heat treatment before coating | | | Polyol having anthraquinone skeleton | |
| | Temp. (° C.) | Residual water content (%) | Amount of squaric acid added (wt %) | Kind | Amount added (wt %) |
| Comparative Example 1 | — | — | — | — | — |
| Comparative Example 2 | — | — | — | — | — |
| Comparative Example 3 | — | — | — | — | — |
| Comparative Example 4 | — | — | — | — | — |
| Comparative Example 5 | — | — | — | — | — |
| Comparative Example 6 | 40 | 0.34 | — | — | — |
| Comparative Example 7 | 60 | 0.18 | — | — | — |
| Comparative Example 8 | 10 cooled | 0.76 | — | — | — |
| Comparative Example 9 | 40 | 0.30 | 0.005 | — | — |
| Comparative Example 10 | 60 | 0.19 | 0.1* | — | — |
| Comparative Example 11 | 60 | 0.18 | — | Alizarin | 0.1 |
| Comparative Example 12 | — | — | 1.0 | — | — |
| Comparative Example 13 | — | — | — | Alizarin | 1.0 |
| Comparative Example 14 | — | — | 0.5 | Alizarin | 0.5 |

| Comparative Examples | Coating treatment Coating of upper layer Alkylene glycol | | |
|---|---|---|---|
| | Kind | Amount added (wt %) | Mixing temperature (° C.) |
| Comparative Example 1 | — | — | — |
| Comparative Example 2 | — | — | — |
| Comparative Example 3 | — | — | — |
| Comparative Example 4 | — | — | — |
| Comparative Example 5 | — | — | — |
| Comparative Example 6 | Propylene glycol | 0.1 | 80 |
| Comparative Example 7 | 1,5-pentane diol | 0.1 | 80 |
| Comparative Example 8 | 1,4-butane diol | 1.0 | 40 |
| Comparative Example 9 | Propylene glycol | 0.1 | 60 |
| Comparative Example 10 | 1,5-pentane diol* | 0.2 | 60 |
| Comparative Example 11 | 1,4-butane diol | 0.002 | 60 |
| Comparative Example 12 | — | — | — |
| Comparative Example 13 | — | — | — |
| Comparative Example 14 | — | — | — |

(Note):
*: The order of coating was reversed, that is, after 1,5-pentane diol was applied, the coating of squaric acid was conducted.

Examples 16 to 27 and Comparative Examples 15 to 28

Production of Organic solvent-type Paint Using Iron Oxide-Based Particles

The same procedure as defined in Example 3 was conducted except that kind and amount of iron oxide-based particles or iron oxide hydroxide particles to be treated were varied as shown in Tables 3 and 4, thereby producing an organic solvent-type paint. Various conditions used for the production of the organic solvent-type paint and properties of the obtained organic solvent-type paints are shown in Tables 3 and 4.

TABLE 3

| | | Coated pigment particles | | |
|---|---|---|---|---|
| Examples | Kind (Example No.) | Coating amount of squaric acid (calculated as C) (wt %) | Coating amount of polyol having an anthraquinone skeleton (calculated as C) (wt %) | Coating amount of alkylene glycol (calculated as C) (wt %) |
| Example 16 | Example 4 | 0.61 | — | 0.67 |
| Example 17 | Example 5 | 0.40 | — | 0.89 |
| Example 18 | Example 6 | 1.21 | — | 2.21 |
| Example 19 | Example 7 | 2.00 | — | 0.22 |
| Example 20 | Example 8 | — | 0.68 | 0.68 |
| Example 21 | Example 9 | — | 0.68 | 1.10 |
| Example 22 | Example 10 | — | 0.34 | 0.28 |
| Example 23 | Example 11 | — | 2.01 | 0.09 |
| Example 24 | Example 12 | 0.20 | 1.00 | 0.70 |
| Example 25 | Example 13 | 0.61 | 0.33 | 1.50 |
| Example 26 | Example 14 | 0.41 | 0.67 | 0.90 |
| Example 27 | Example 15 | 0.82 | 1.33 | 1.13 |

| | | Properties of organic solvent-type paint | | |
|---|---|---|---|---|
| | | Gloss | | Dispersion stability (absolute value |
| Examples | Paint viscosity (cP) | Dispersion time of mill base: 45 minutes (%) | Dispersion time of mill base: 90 minutes (%) | of reduction percentage of gloss) (%) |
| Example 16 | 879 | 88 | 91 | 6 |
| Example 17 | 973 | 87 | 91 | 5 |
| Example 18 | 1024 | 89 | 93 | 7 |
| Example 19 | 2560 | 84 | 87 | 8 |
| Example 20 | 568 | 83 | 87 | 6 |
| Example 21 | 768 | 83 | 88 | 6 |
| Example 22 | 923 | 90 | 93 | 1 |
| Example 23 | 870 | 90 | 93 | 3 |
| Example 24 | 768 | 88 | 91 | 2 |
| Example 25 | 2688 | 91 | 94 | 5 |
| Example 26 | 768 | 90 | 92 | 4 |
| Example 27 | 691 | 93 | 95 | 3 |

TABLE 4

| | | Coated pigment particles | | |
|---|---|---|---|---|
| Comparative Examples | Kind (Example No.) | Coating amount of squaric acid (calculated as C) (wt %) | Coating amount of polyol having an anthraquinone skeleton (calculated as C) (wt %) | Coating amount of alkylene glycol (calculated as C) (wt %) |
| Comparative Example 15 | Comparative Example 1 | — | — | — |
| Comparative Example 16 | Comparative Example 2 | — | — | — |
| Comparative Example 17 | Comparative Example 3 | — | — | — |
| Comparative Example 18 | Comparative Example 4 | — | — | — |
| Comparative Example 19 | Comparative Example 5 | — | — | — |
| Comparative Example 20 | Comparative Example 6 | — | — | 0.04 |
| Comparative Example 21 | Comparative Example 7 | — | — | 0.05 |
| Comparative Example 22 | Comparative Example 8 | — | — | 0.51 |
| Comparative Example 23 | Comparative Example 9 | 0.002 | — | 0.04 |
| Comparative Example 24 | Comparative Example 10 | 0.04 | — | 0.11 |

TABLE 4-continued

| | | | | |
|---|---|---|---|---|
| Comparative Example 25 | Comparative Example 11 | — | 0.07 | 0.001 |
| Comparative Example 26 | Comparative Example 12 | 0.41 | — | — |
| Comparative Example 27 | Comparative Example 13 | — | 0.68 | — |
| Comparative Example 28 | Comparative Example 14 | 0.20 | 0.33 | — |

| | | Properties of organic solvent-type paint | | |
|---|---|---|---|---|
| | | Gloss | | Dispersion stability (absolute value |
| Examples | Paint viscosity (cP) | Dispersion time of mill base: 45 minutes (%) | Dispersion time of mill base: 90 minutes (%) | of reduction percentage of gloss) (%) |
| Comparative Example 15 | 1024 | 78 | 83 | 11 |
| Comparative Example 16 | 1050 | 76 | 83 | 12 |
| Comparative Example 17 | 2253 | 70 | 77 | 12 |
| Comparative Example 18 | 896 | 72 | 79 | 14 |
| Comparative Example 19 | 870 | 75 | 81 | 13 |
| Comparative Example 20 | 998 | 77 | 84 | 13 |
| Comparative Example 21 | 1024 | 78 | 86 | 11 |
| Comparative Example 22 | 1050 | 79 | 84 | 10 |
| Comparative Example 23 | 1100 | 79 | 86 | 10 |
| Comparative Example 24 | 973 | 76 | 85 | 12 |
| Comparative Example 25 | 923 | 81 | 86 | 10 |
| Comparative Example 26 | 896 | 83 | 85 | 10 |
| Comparative Example 27 | 998 | 84 | 86 | 11 |
| Comparative Example 28 | 896 | 84 | 86 | 9 |

Examples 28 to 39 and Comparative Examples 29 to 42

Production of Water-Based Paint Using Iron Oxide-Based Particles

The same procedure as defined in Example 2 was conducted except that kind of coated iron oxide-based particles or coated iron oxide hydroxide particles used were varied as shown in Tables 5 and 6, thereby producing a water-based paint. Various conditions used for the production of the water-based paint and properties of the obtained water-based paints are shown in Tables 5 and 6.

TABLE 5

| | Coated pigment particles | | | |
|---|---|---|---|---|
| Examples | Kind (Example No.) | Coating amount of squaric acid (calculated as C) (wt %) | Coating amount of polyol having an anthraquinone skeleton (calculated as C) (wt %) | Coating amount of alkylene glycol (calculated as C) (wt %) |
| Example 28 | Example 4 | 0.61 | — | 0.67 |
| Example 29 | Example 5 | 0.41 | — | 0.89 |
| Example 30 | Example 6 | 1.21 | — | 2.21 |
| Example 31 | Example 7 | 2.00 | — | 0.22 |
| Example 32 | Example 8 | — | 0.68 | 0.68 |
| Example 33 | Example 9 | — | 0.68 | 1.10 |
| Example 34 | Example 10 | — | 0.34 | 0.28 |
| Example 35 | Example 11 | — | 2.01 | 0.09 |

TABLE 5-continued

| Example 36 | Example 12 | 0.20 | 1.00 | 0.70 |
| Example 37 | Example 13 | 0.61 | 0.33 | 1.50 |
| Example 38 | Example 14 | 0.41 | 0.67 | 0.90 |
| Example 39 | Example 15 | 0.82 | 1.33 | 1.13 |

| | Properties of water-based paint | | |
|---|---|---|---|
| | | Gloss | |
| Examples | Paint viscosity (cP) | Dispersion time of mill base: 45 minutes (%) | Dispersion time of mill base: 90 minutes (%) |
| Example 28 | 1280 | 87 | 91 |
| Example 29 | 1126 | 86 | 90 |
| Example 30 | 1331 | 86 | 87 |
| Example 31 | 2304 | 84 | 86 |
| Example 32 | 896 | 80 | 85 |
| Example 33 | 973 | 80 | 86 |
| Example 34 | 1024 | 88 | 91 |
| Example 35 | 1075 | 87 | 93 |
| Example 36 | 972 | 91 | 96 |
| Example 37 | 2048 | 88 | 91 |
| Example 38 | 896 | 86 | 94 |
| Example 39 | 844 | 86 | 95 |

| | Properties of water-based paint | | |
|---|---|---|---|
| Examples | Dispersion stability (absolute value of reduction percentage of gloss) (%) | Storage stability (%) | Zeta potential (mV) |
| Example 28 | 6 | 83 | −37.6 |
| Example 29 | 7 | 80 | −38.9 |
| Example 30 | 7 | 88 | −41.3 |
| Example 31 | 10 | 86 | −36.8 |
| Example 32 | 8 | 80 | −41.5 |
| Example 33 | 6 | 86 | −33.6 |
| Example 34 | 6 | 83 | −42.3 |
| Example 35 | 7 | 91 | −53.2 |
| Example 36 | 6 | 86 | −41.9 |
| Example 37 | 6 | 88 | −51.3 |
| Example 38 | 4 | 90 | −48.7 |
| Example 39 | 5 | 88 | −46.1 |

TABLE 6

| | | Coated pigment particles | | |
|---|---|---|---|---|
| Comparative Examples | Kind (Example No.) | Coating amount of squaric acid (calculated as C) (wt %) | Coating amount of polyol having an anthraquinone skeleton (calculated as C) (wt %) | Coating amount of alkylene glycol (calculated as C) (wt %) |
| Comparative Example 29 | Comparative Example 1 | — | — | — |
| Comparative Example 30 | Comparative Example 2 | — | — | — |
| Comparative Example 31 | Comparative Example 3 | — | — | — |
| Comparative Example 32 | Comparative Example 4 | — | — | — |
| Comparative Example 33 | Comparative Example 5 | — | — | — |
| Comparative Example 34 | Comparative Example 6 | — | — | 0.04 |
| Comparative Example 35 | Comparative Example 7 | — | — | 0.05 |
| Comparative Example 36 | Comparative Example 8 | — | — | 0.51 |
| Comparative Example 37 | Comparative Example 9 | 0.002 | — | 0.04 |
| Comparative Example 38 | Comparative Example 10 | 0.04 | — | 0.11 |

TABLE 6-continued

| Comparative Example | Comparative Example | | | |
|---|---|---|---|---|
| Comparative Example 39 | Comparative Example 11 | — | 0.07 | 0.001 |
| Comparative Example 40 | Comparative Example 12 | 0.41 | — | — |
| Comparative Example 41 | Comparative Example 13 | — | 0.68 | — |
| Comparative Example 42 | Comparative Example 14 | 0.20 | 0.33 | — |

| | Properties of water-based paint | | |
|---|---|---|---|
| | | Gloss | |
| Comparative Examples | Paint viscosity (cP) | Dispersion time of mill base: 45 minutes (%) | Dispersion time of mill base: 90 minutes (%) |
| Comparative Example 29 | 1050 | 63 | 68 |
| Comparative Example 30 | 1100 | 62 | 66 |
| Comparative Example 31 | 2560 | 60 | 64 |
| Comparative Example 32 | 896 | 58 | 53 |
| Comparative Example 33 | 998 | 65 | 71 |
| Comparative Example 34 | 1100 | 68 | 73 |
| Comparative Example 35 | 998 | 71 | 76 |
| Comparative Example 36 | 1152 | 73 | 76 |
| Comparative Example 37 | 1024 | 70 | 75 |
| Comparative Example 38 | 879 | 72 | 74 |
| Comparative Example 39 | 768 | 69 | 75 |
| Comparative Example 40 | 1050 | 66 | 71 |
| Comparative Example 41 | 1152 | 71 | 76 |
| Comparative Example 42 | 1203 | 68 | 71 |

| | Properties of water-based paint | | |
|---|---|---|---|
| Examples | Dispersion stability (absolute value of reduction percentage of gloss) (%) | Storage stability (%) | Zeta potential (mV) |
| Comparative Example 29 | 15 | 62 | −13.6 |
| Comparative Example 30 | 18 | 62 | −16.5 |
| Comparative Example 31 | 12 | 59 | −10.6 |
| Comparative Example 32 | 18 | 46 | −11.3 |
| Comparative Example 33 | 20 | 42 | −8.4 |
| Comparative Example 34 | 12 | 63 | −18.6 |
| Comparative Example 35 | 13 | 62 | −17.8 |
| Comparative Example 36 | 11 | 60 | −21.6 |
| Comparative Example 37 | 11 | 59 | −16.8 |
| Comparative Example 38 | 12 | 63 | −19.8 |
| Comparative Example 39 | 13 | 65 | −23.8 |
| Comparative | 14 | 61 | −19.7 |

TABLE 6-continued

| | | | |
|---|---|---|---|
| Example 40 | | | |
| Comparative Example 41 | 11 | 58 | −13.6 |
| Comparative Example 42 | 15 | 63 | −11.8 |

Examples 40 to 51 and Comparative Examples 43 to 56

Production of Pigment Using Particles Other Than Iron Oxide-Based Particles

The same procedure as defined in Example 1 was conducted except that kind of particles to be treated, coating amount of squaric acid, kind and coating amount of polyol having an anthraquinone skeleton added, kind and coating amount of alkylene glycol added and mixing temperatures therefor were varied as shown in Tables 7 and 8, thereby producing coated pigment particles as pigments. Various conditions used for the production of the pigments are shown in Tables 7 and 8.

TABLE 7

| | Coating treatment Particles to be treated | | |
|---|---|---|---|
| Examples | Kind | Shape | Major axial diameter ($\mu$m) |
| Example 40 | Titanium dioxide | Granular | 0.28 |
| Example 41 | Titanium dioxide | Granular | 0.25 |
| Example 42 | Chrome yellow | Granular | 0.36 |
| Example 43 | Chrome yellow | Granular | 0.32 |
| Example 44 | Chromium oxide green | Granular | 0.30 |
| Example 45 | Chromium oxide green | Granular | 0.30 |
| Example 46 | Titanium dioxide | Granular | 0.28 |
| Example 47 | Titanium dioxide | Granular | 0.25 |
| Example 48 | Chrome yellow | Granular | 0.36 |
| Example 49 | Chrome yellow | Granular | 0.32 |
| Example 50 | Chromium oxide green | Granular | 0.30 |
| Example 51 | Chromium oxide green | Granular | 0.31 |

| | Coating treatment Particles to be treated | | |
|---|---|---|---|
| Examples | Minor axial diameter ($\mu$m) | BET specific surface area (m$^2$/g) | Amount (kg) |
| Example 40 | — | 10.6 | 2.5 |
| Example 41 | — | 16.8 | 2.5 |
| Example 42 | — | 6.4 | 2.5 |
| Example 43 | — | 9.8 | 2.5 |
| Example 44 | — | 6.9 | 2.5 |
| Example 45 | — | 6.9 | 2.5 |
| Example 46 | — | 10.6 | 2.5 |
| Example 47 | — | 16.8 | 2.5 |
| Example 48 | — | 6.4 | 2.5 |
| Example 49 | — | 9.8 | 2.5 |
| Example 50 | — | 7.2 | 2.5 |
| Example 51 | — | 6.9 | 2.5 |

| | Coating treatment | | | |
|---|---|---|---|---|
| | Coating of lower layer | | | |
| | Heat treatment before coating | | Amount of | Polyol having anthraquinone skeleton |
| | | Residual | squaric | |
| | | water | acid | Amount |
| | Temp. | content | added | added |
| Examples | (° C.) | (%) | (wt %) | Kind | (wt %) |
| Example 40 | 60 | 0.18 | 2.0 | — | — |
| Example 41 | 80 | 0.11 | 0.5 | — | — |
| Example 42 | 70 | 0.16 | 3.0 | — | — |
| Example 43 | 60 | 0.17 | 5.0 | — | — |
| Example 44 | 80 | 0.09 | — | Alizarin | 1.0 |
| Example 45 | 65 | 0.10 | — | Alizarin | 0.5 |
| Example 46 | 80 | 0.10 | — | Alizarin | 3.0 |
| Example 47 | 60 | 0.11 | — | Alizarin | 1.0 |
| Example 48 | 60 | 0.14 | 0.5 | Alizarin | 1.5 |
| Example 49 | 40 | 0.25 | 3.0 | Alizarin | 0.2 |
| Example 50 | 65 | 0.13 | 1.5 | Alizarin | 1.0 |
| Example 51 | 75 | 0.09 | 0.2 | Chrysazin | 1.5 |

| | Coating treatment Coating of upper layer Alkylene glycol | | |
|---|---|---|---|
| Examples | Kind | Amount added (wt %) | Mixing temperature (° C.) |
| Example 40 | Propylene glycol | 2.0 | 60 |
| Example 41 | Propylene glycol | 3.0 | 65 |
| Example 42 | Propylene glycol | 0.5 | 80 |
| Example 43 | Propylene glycol | 1.5 | 75 |
| Example 44 | Propylene glycol | 2.0 | 60 |
| Example 45 | 1,5-pentane diol | 5.0 | 60 |
| Example 46 | 1,5-pentane diol | 0.1 | 70 |
| Example 47 | Propylene glycol | 1.5 | 40 |
| Example 48 | Propylene glycol | 2.0 | 55 |
| Example 49 | 1,4-butane diol | 1.0 | 70 |
| Example 50 | 1,4-butane diol | 2.5 | 80 |
| Example 51 | 1,5-pentane diol | 1.5 | 60 |

TABLE 8

| | Coating treatment Particles to be treated | | |
|---|---|---|---|
| Comparative Examples | Kind | Shape | Major axial diameter ($\mu$m) |
| Comparative Example 43 | Titanium dioxide | Granular | 0.28 |
| Comparative Example 44 | Titanium dioxide | Granular | 0.25 |
| Comparative Example 45 | Chrome yellow | Granular | 0.36 |

TABLE 8-continued

| Comparative Examples | | | | |
|---|---|---|---|---|
| Comparative Example 46 | Chrome yellow | Granular | 0.32 | |
| Comparative Example 47 | Chromium oxide green | Granular | 0.30 | |
| Comparative Example 48 | Titanium dioxide | Granular | 0.28 | |
| Comparative Example 49 | Titanium dioxide | Granular | 0.28 | |
| Comparative Example 5Q | Titanium dioxide | Granular | 0.28 | |
| Comparative Example 51 | Titanium dioxide | Granular | 0.28 | |
| Comparative Example 52 | Titanium dioxide | Granular | 0.28 | |
| Comparative Example 53 | Titanium dioxide | Granular | 0.28 | |
| Comparative Example 54 | Titanium dioxide | Granular | 0.28 | |
| Comparative Example 55 | Titanium dioxide | Granular | 0.28 | |
| Comparative Example 56 | Titanium dioxide | Granular | 0.28 | |

| | Coating treatment Particles to be treated | | |
|---|---|---|---|
| Comparative Examples | Minor axial diameter (μm) | BET specific surface area (m²/g) | Amount (kg) |
| Comparative Example 43 | — | 10.6 | — |
| Comparative Example 44 | — | 16.8 | — |
| Comparative Example 45 | — | 6.4 | — |
| Comparative Example 46 | — | 9.8 | — |
| Comparative Example 47 | — | 6.9 | — |
| Comparative Example 48 | — | 10.6 | 2.5 |
| Comparative Example 49 | — | 10.6 | 2.5 |
| Comparative Example 50 | — | 10.6 | 2.5 |
| Comparative Example 51 | — | 10.6 | 2.5 |
| Comparative Example 52 | — | 10.6 | 2.5 |
| Comparative Example 53 | — | 10.6 | 2.5 |
| Comparative Example 54 | — | 10.6 | 2.5 |
| Comparative Example 55 | — | 10.6 | 2.5 |
| Comparative Example 56 | — | 10.6 | 2.5 |

| | Coating treatment | | | |
|---|---|---|---|---|
| | Coating of lower layer | | | |
| | Heat treatment before coating | | Polyol having anthraquinone skeleton | |
| Comparative Examples | Temp. (° C.) | Residual water content (%) | squaric acid added (wt %) | Kind | Amount added (wt %) |
| Comparative Example 43 | — | — | — | — | — |
| Comparative Example 44 | — | — | — | — | — |
| Comparative Example 45 | — | — | — | — | — |
| Comparative Example 46 | — | — | — | — | — |
| Comparative Example 47 | — | — | — | — | — |
| Comparative Example 48 | 40 | 0.40 | — | — | — |
| Comparative Example 49 | 60 | 0.19 | — | — | — |
| Comparative Example 50 | 15 | 1.01 | — | — | — |
| Comparative Example 51 | 60 | 0.16 | 0.002 | — | — |
| Comparative Example 52 | 60 | 0.17 | 0.2* | — | — |
| Comparative Example 53 | 40 | 0.32 | — | Alizarin | 0.1 |
| Comparative Example 54 | — | — | 1.5 | — | — |
| Comparative Example 55 | — | — | — | Alizarin | 0.8 |
| Comparative Example 56 | — | — | 0.3 | Alizarin | 1.0 |

| | Coating treatment Coating of upper layer Alkylene glycol | | |
|---|---|---|---|
| Comparative Examples | Kind | Amount added (wt %) | Mixing temperature (° C.) |
| Comparative Example 43 | — | — | — |
| Comparative Example 44 | — | — | — |
| Comparative Example 45 | — | — | — |
| Comparative Example 46 | — | — | — |
| Comparative Example 47 | — | — | — |
| Comparative Example 48 | Propylene glycol | 0.5 | 80 |
| Comparative Example 49 | 1,5-pentane diol | 0.1 | 40 |
| Comparative Example 50 | 1,4-butane diol | 0.2 | 80 |
| Comparative Example 51 | Propylene glycol | 0.05 | 60 |
| Comparative Example 52 | 1,5-pentane diol* | 0.3 | 60 |
| Comparative Example 53 | 1,4-butane diol | 0.003 | 60 |
| Comparative Example 54 | | | |
| Comparative Example 55 | | | |
| Comparative Example 56 | | | |

(Note) *: The coating order was reversed, that is, after 115-pentane diol was applied, the coating of squaric acid was conducted.

Examples 52 to 63 and Comparative Examples 57 to 70

Production of Organic solvent-type Paint Using Pigment Particles Other Than Iron Oxide-Based Particles The same procedure as defined in Example 3 was conducted except that kind of coated pigment particles used were varied as shown in Tables 9 and 10, thereby producing an organic solvent-type paint. Various conditions used for the production of the organic solvent-type paint and properties of the obtained organic solvent-type paints are shown in Tables 9 and 10.

TABLE 9

Coated pigment particles

| Examples | Kind (Example No.) | Coating amount of squaric acid (calculated as C) (wt %) | Coating amount of polyol having an anthraquinone skeleton (calculated as C) (wt %) | Coating amount of alkylene glycol (calculated as C) (wt %) |
|---|---|---|---|---|
| Example 52 | Example 40 | 0.81 | — | 0.90 |
| Example 53 | Example 41 | 0.20 | — | 1.31 |
| Example 54 | Example 42 | 1.21 | — | 0.23 |
| Example 55 | Example 43 | 1.98 | — | 0.70 |
| Example 56 | Example 44 | — | 0.68 | 0.90 |
| Example 57 | Example 45 | — | 0.34 | 2.68 |
| Example 58 | Example 46 | — | 2.03 | 0.05 |
| Example 59 | Example 47 | — | 0.68 | 0.66 |
| Example 60 | Example 48 | 0.20 | 1.01 | 0.91 |
| Example 61 | Example 49 | 1.20 | 0.13 | 0.49 |
| Example 62 | Example 50 | 0.61 | 0.69 | 1.27 |
| Example 63 | Example 51 | 0.08 | 1.02 | 0.82 |

Properties of organic solvent-type paint

| Examples | Paint viscosity (cP) | Gloss Dispersion time of mill base: 45 minutes (%) | Gloss Dispersion time of mill base: 90 minutes (%) | Dispersion stability (absolute value of reduction percentage of gloss) (%) |
|---|---|---|---|---|
| Example 52 | 768 | 83 | 88 | 6 |
| Example 53 | 870 | 85 | 91 | 8 |
| Example 54 | 568 | 81 | 86 | 9 |
| Example 55 | 568 | 81 | 83 | 8 |
| Example 56 | 870 | 78 | 86 | 8 |
| Example 57 | 768 | 80 | 84 | 7 |
| Example 58 | 870 | 87 | 93 | 4 |
| Example 59 | 768 | 88 | 91 | 3 |
| Example 60 | 614 | 82 | 87 | 7 |
| Example 61 | 640 | 83 | 88 | 6 |
| Example 62 | 742 | 84 | 90 | 8 |
| Example 63 | 717 | 85 | 91 | 6 |

TABLE 10

Coated pigment particles

| Comparative Examples | Kind (Example No.) | Coating amount of squaric acid (calculated as C) (wt %) | Coating amount of polyol having an anthraquinone skeleton (calculated as C) (wt %) | Coating amount of alkylene glycol (calculated as C) (wt %) |
|---|---|---|---|---|
| Comparative Example 57 | Comparative Example 43 | — | — | — |
| Comparative Example 58 | Comparative Example 44 | — | — | — |
| Comparative Example 59 | Comparative Example 45 | — | — | — |
| Comparative Example 60 | Comparative Example 46 | — | — | — |
| Comparative Example 61 | Comparative Example 47 | — | — | — |
| Comparative Example 62 | Comparative Example 48 | — | — | 0.23 |
| Comparative Example 63 | Comparative Example 49 | — | — | 0.05 |
| Comparative Example 64 | Comparative Example 50 | — | — | 0.10 |
| Comparative Example 65 | Comparative Example 51 | 0.0008 | — | 0.02 |
| Comparative | Comparative | 0.084 | — | 0.10 |

TABLE 10-continued

| Examples | | | | |
|---|---|---|---|---|
| Example 66 Comparative Example 67 | Example 52 Comparative Example 53 | — | 0.07 | 0.001 |
| Comparative Example 68 | Comparative Example 54 | 0.60 | — | — |
| Comparative Example 69 | Comparative Example 55 | — | 0.55 | — |
| Comparative Example 70 | Comparative Example 56 | 0.12 | 0.68 | — |

Properties of organic solvent-type paint

| Examples | Paint viscosity (cP) | Gloss Dispersion time of mill base: 45 minutes (%) | Gloss Dispersion time of mill base: 90 minutes (%) | Dispersion stability (absolute value of reduction percentage of gloss) (%) |
|---|---|---|---|---|
| Comparative Example 57 | 870 | 71 | 74 | 16 |
| Comparative Example 58 | 896 | 71 | 75 | 18 |
| Comparative Example 59 | 768 | 73 | 78 | 13 |
| Comparative Example 60 | 717 | 71 | 76 | 12 |
| Comparative Example 61 | 1024 | 69 | 73 | 15 |
| Comparative Example 62 | 870 | 73 | 78 | 14 |
| Comparative Example 63 | 819 | 73 | 78 | 13 |
| Comparative Example 64 | 845 | 72 | 76 | 18 |
| Comparative Example 65 | 870 | 74 | 79 | 17 |
| Comparative Example 66 | 768 | 77 | 81 | 15 |
| Comparative Example 67 | 921 | 76 | 79 | 13 |
| Comparative Example 68 | 896 | 77 | 79 | 13 |
| Comparative Example 69 | 870 | 74 | 76 | 12 |
| Comparative Example 70 | 717 | 75 | 77 | 12 |

Examples 64 to 75 and Comparative Examples 71 to 84

Production of Water-Based Paint Using Pigment Particles Other Than Iron Oxide-Based Particles The same procedure as defined in Example 2 was conducted except that kind of coated pigment particles used were varied as shown in Tables 11 and 12, thereby producing a water-based paint. Various conditions used for the production of the water-based paints and properties of the obtained water-based paints are shown in Tables 11 and 12.

TABLE 11

| | Coated pigment particles | | | |
|---|---|---|---|---|
| Examples | Kind (Example No.) | Coating amount of squaric acid (calculated as C) (wt %) | Coating amount of polyol having an anthraquinone skeleton (calculated as C) (wt %) | Coating amount of alkylene glycol (calculated as C) (wt %) |
| Example 64 | Example 40 | 0.39 | — | 0.46 |
| Example 65 | Example 41 | 0.20 | — | 1.31 |
| Example 66 | Example 42 | 1.21 | — | 0.23 |
| Example 67 | Example 43 | 1.98 | — | 0.70 |
| Example 68 | Example 44 | — | 0.68 | 0.90 |
| Example 69 | Example 45 | — | 0.34 | 2.68 |
| Example 70 | Example 46 | — | 2.03 | 0.05 |

TABLE 11-continued

| Example 71 | Example 47 | —    | 0.68 | 0.66 |
|------------|------------|------|------|------|
| Example 72 | Example 48 | 0.20 | 1.01 | 0.91 |
| Example 73 | Example 49 | 1.20 | 0.13 | 0.49 |
| Example 74 | Example 50 | 0.61 | 0.69 | 1.27 |
| Example 75 | Example 51 | 0.08 | 1.02 | 0.82 |

| | Properties of water-based paint | | |
|---|---|---|---|
| | | Gloss | |
| Examples | Paint viscosity (cP) | Dispersion time of mill base: 45 minutes (%) | Dispersion time of mill base: 90 minutes (%) |
| Example 64 | 819 | 82 | 84 |
| Example 65 | 794 | 85 | 87 |
| Example 66 | 666 | 82 | 86 |
| Example 67 | 691 | 83 | 86 |
| Example 68 | 947 | 79 | 83 |
| Example 69 | 998 | 79 | 82 |
| Example 70 | 896 | 88 | 90 |
| Example 71 | 794 | 87 | 89 |
| Example 72 | 691 | 85 | 88 |
| Example 73 | 717 | 84 | 88 |
| Example 74 | 768 | 83 | 89 |
| Example 75 | 819 | 83 | 88 |

| | Properties of water-based paint | | |
|---|---|---|---|
| Examples | Dispersion stability (absolute value of reduction percentage of gloss) (%) | Storage stability (%) | Zeta potential (mV) |
| Example 64 | 9 | 75 | −41.6 |
| Example 65 | 8 | 81 | −42.1 |
| Example 66 | 7 | 80 | −31.6 |
| Example 67 | 7 | 80 | −38.2 |
| Example 68 | 9 | 74 | −45.6 |
| Example 69 | 8 | 77 | −42.1 |
| Example 70 | 6 | 83 | −51.3 |
| Example 71 | 5 | 85 | −53.8 |
| Example 72 | 3 | 83 | −48.9 |
| Example 73 | 4 | 82 | −50.0 |
| Example 74 | 8 | 80 | −49.3 |
| Example 75 | 6 | 83 | −46.5 |

TABLE 12

| | | Coated pigment particles | | |
|---|---|---|---|---|
| Comparative Examples | Kind (Example No.) | Coating amount of squaric acid (calculated as C) (wt %) | Coating amount of polyol having an anthraquinone skeleton (calculated as C) (wt %) | Coating amount of alkylene glycol (calculated as C) (wt %) |
| Comparative Example 71 | Comparative Example 43 | — | — | — |
| Comparative Example 72 | Comparative Example 44 | — | — | — |
| Comparative Example 73 | Comparative Example 45 | — | — | — |
| Comparative Example 74 | Comparative Example 46 | — | — | — |
| Comparative Example 75 | Comparative Example 47 | — | — | — |
| Comparative Example 76 | Comparative Example 48 | — | — | 0.23 |
| Comparative Example 77 | Comparative Example 49 | — | — | 0.05 |
| Comparative Example 78 | Comparative Example 50 | — | — | 0.10 |
| Comparative Example 79 | Comparative Example 51 | 0.0008 | — | 0.02 |
| Comparative Example 80 | Comparative Example 52 | 0.084 | — | 0.15 |
| Comparative Example 81 | Comparative Example 53 | — | 0.07 | 0.001 |
| Comparative Example 82 | Comparative Example 54 | 0.60 | — | — |
| Comparative Example 83 | Comparative Example 55 | — | 0.55 | — |
| Comparative Example 84 | Comparative Example 56 | 0.12 | 0.68 | — |

| | Properties of water-based paint | | |
|---|---|---|---|
| | Paint | Gloss | |
| Comparative Examples | viscosity (cP) | Dispersion time of mill base: 45 minutes (%) | Dispersion time of mill base: 90 minutes (%) |
| Comparative Example 71 | 1024 | 60 | 67 |
| Comparative Example 72 | 1100 | 63 | 71 |
| Comparative Example 73 | 998 | 61 | 69 |
| Comparative | 923 | 62 | 71 |

TABLE 12-continued

| | | | |
|---|---|---|---|
| Example 74 | | | |
| Comparative Example 75 | 768 | 59 | 66 |
| Comparative Example 76 | 973 | 65 | 72 |
| Comparative Example 77 | 998 | 68 | 75 |
| Comparative Example 78 | 896 | 66 | 76 |
| Comparative Example 79 | 1024 | 70 | 75 |
| Comparative Example 80 | 896 | 68 | 74 |
| Comparative Example 81 | 923 | 66 | 75 |
| Comparative Example 82 | 973 | 65 | 72 |
| Comparative Example 83 | 896 | 68 | 73 |
| Comparative Example 84 | 819 | 68 | 74 |

| | Properties of water-based paint | | |
|---|---|---|---|
| Comparative Examples | Dispersion stability (absolute value of reduction percentage of gloss) (%) | Storage stability (%) | Zeta potential (mV) |
| Comparative Example 71 | 18 | 66 | −14.7 |
| Comparative Example 72 | 20 | 72 | −15.6 |
| Comparative Example 73 | 15 | 68 | −21.3 |
| Comparative Example 74 | 21 | 71 | −18.8 |
| Comparative Example 75 | 23 | 56 | −10.5 |
| Comparative Example 76 | 16 | 70 | −19.6 |
| Comparative Example 77 | 18 | 65 | −21.2 |
| Comparative Example 78 | 17 | 60 | −23.8 |
| Comparative Example 79 | 15 | 62 | −19.8 |
| Comparative Example 80 | 18 | 62 | −18.6 |
| Comparative Example 81 | 17 | 63 | −17.8 |
| Comparative Example 82 | 16 | 68 | −25.3 |
| Comparative Example 83 | 14 | 70 | −28.6 |
| Comparative Example 84 | 14 | 72 | −27.9 |

What is claimed is:

1. A pigment comprising a pigment particle as core particle, selected from the group consisting of white pigment particles, black pigment particles, yellow pigment particles, orange pigment particles, brown pigment particles, red pigment particles, violet pigment particles, blue pigment particles and green pigment particles;

a lower coat formed on at least a part of a surface of the pigment particle, comprising squaric acid, a polyol having an anthraquinone skeleton represented by the general formula (I):

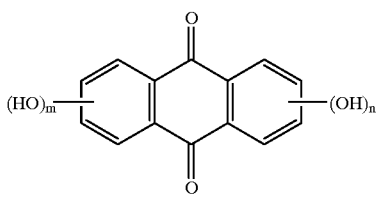

(I)

wherein m is an integer of 0 to 4, n is an integer of 0 to 4 and m+n is an integer of 2 to 4, or a mixture of the squaric acid and the polyol having an anthraquinone skeleton represented by the general formula (I)

and an upper coat formed on at least a part of surface of said lower coat and pigment particle, comprising at least one alkylene glycol represented by the general formula (II):

$$C_qH_{2q}(OH)_2 \qquad (II)$$

wherein q is an integer of 2 to 10;

wherein the amount of squaric acid is 0.01 to 10% by weight, calculated as carbon based on the total weight of the pigment particle as core particle, the amount of the polyol of formula (I) is 0.01 to 10% by weight, calculated as carbon based on the total weight of the pigment particle as core particle, the total amount of squaric acid and the polyol of formula (I) is 0.01 to 10% by weight, calculated as carbon based on the total weight of the pigment particle as core particle, and the amount of the alkylene glycol of formula (II) is 0.01 to 10% by weight, calculated as carbon based on the total weight of the pigment particle as core particle.

2. A pigment according to claim 1, wherein said lower coat comprises squaric acid, and said upper coat comprises at least one alkylene glycol represented by the general formula (II):

$$C_qH_{2q}(OH)_2 \qquad (II)$$

wherein q is an integer of 2 to 10.

3. A pigment according to claim 1, wherein said lower coat comprises polyol having an anthraquinone skeleton represented by the general formula (I):

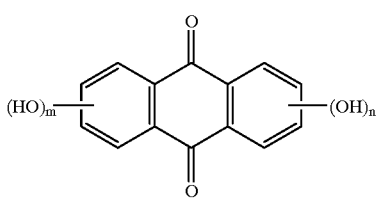

(I)

wherein m is an integer of 0 to 4, n is an integer of 0 to 4 and m+n is an integer 2 to 4, and said upper coat comprises at least one alkylene glycol represented by the general formula (II):

$$C_qH_{2q}(OH)_2 \qquad (II)$$

wherein q is an integer of 2 to 10.

4. A pigment according to claim 1, wherein said lower coat comprises a mixture of squaric acid and polyol having an anthraquinone skeleton represented by the general formula (I):

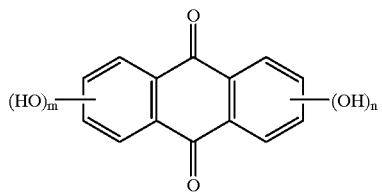

(I)

wherein m is an integer of 0 to 4, n is an integer of 0 to 4 and m+n is an integer of 2 to 4,
and said upper coat comprises at least one alkylene glycol represented by the general formula (II):

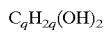

(II)

wherein q is an integer of 2 to 10.

5. A pigment according to claim 1, wherein said pigment particles are white pigment particles selected from the group consisting of zinc white, white lead, basic lead sulfate, lead sulfate, lithopone, zinc sulfide, titanium dioxide and antimony oxide; or black pigment particles selected from the group consisting of carbon black, graphite and black iron oxide; or yellow pigment particles selected from the group consisting of chrome yellow, zinc yellow, barium chromate, cadmium yellow, yellow iron oxide hydroxide, ochre, titan yellow, lead cyanamide and calcium plumbate; or orange pigment particles selected from the group consisting of chrome orange and chrome vermilion; or brown pigment particles selected from the group consisting of brown iron oxide and umber; or red pigment particles selected from the group consisting of red iron oxide, red lead vermilion, cadmium red, cadmium mercury red and antimony vermilion; or violet pigment particles selected from the group consisting of cobalt violet deep, cobalt violet light and manganese violet; or blue pigment particles selected from the group consisting of ultramarine, Prussian blue, cobalt blue and cerulean blue; or green pigment particles selected from the group consisting of chrome green (Prussian blue+chrome yellow), zinc green (zinc yellow+prussian blue), chromium oxide green, veridian, emerald green and cobalt green.

6. A pigment according to claim 5, wherein said pigment particles are zinc white, white lead, titanium dioxide, antimony oxide, black iron oxide, chrome yellow, zinc yellow, cadmium yellow, yellow iron oxide hydroxide, titan yellow, chrome vermilion, brown iron oxide, red iron oxide, cadmium red, cadmium mercury red, cobalt blue, chrome green or chromium oxide green.

7. A pigment according to claim 1 having an average particle size of 0.01 to 10 μm and a BET specific surface area of 0.1 to 80 m²/g.

8. A paint comprising 100 parts by weight of a paint base and 10 to 90 parts by weight of a pigment comprising a pigment particle as core particle, selected from the group consisting of white pigment particles, black pigment particles, yellow pigment particles, orange pigment particles, brown pigment particles, red pigment particles, violet pigment particles, blue pigment particles and green pigment particles;

a lower coat formed on at least a part of a surface of the pigment particle, comprising squaric acid, a polyol having an anthraquinone skeleton represented by the general formula (I):

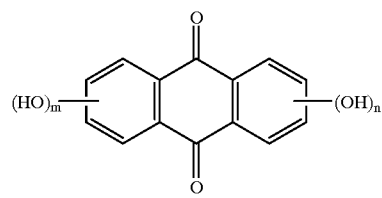

(I)

wherein m is an integer of 0 to 4, n is an integer of 0 to 4 and m+n is an integer of 2 to 4,
or a mixture of the squaric acid and the polyol having an anthraquinone skeleton represented by the general formula (I)

and an upper coat formed on at least a part of surface of said lower coat and pigment particle, comprising at least one alkylene glycol represented by the general formula (II):

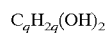

(II)

wherein q is an integer of 2 to 10;

wherein the amount of squaric acid is 0.01 to 10% by weight, calculated as carbon based on the total weight of the pigment particle as core particle, the amount of the polyol of formula (I) is 0.01 to 10% by weight, calculated as carbon based on the total weight of the pigment particle as core particle, the total amount of squaric acid and the polyol of formula (I) is 0.01 to 10% by weight, calculated as carbon based on the total weight of the pigment particle as core particle, and the amount of the alkylene glycol of formula (II) is 0.01 to 10% by weight, calculated as carbon based on the total weight of the pigment particle as core particle.

9. A paint according to claim 8, wherein said paint is a water-based paint.

10. A process for producing a pigment, comprising:
(1) mixing, in a dispersing solvent of water or alcohol pigment particles with
(i) squaric acid,
(ii) a polyol having an anthraquinone skeleton represented by the general formula (I):

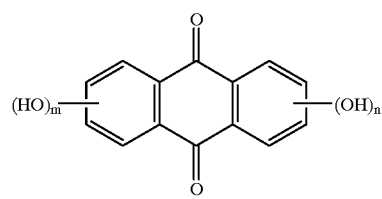

(I)

wherein m is an integer of 0 to 4, n is an integer of 0 to 4 and m+n is an integer of 2 to 4, or
(iii) a mixture of squaric acid and the polyol of formula (I)

the amount of squaric acid is 0.025 to 30.0% by weight based on the weight of the pigment particles as core particles, the amount of the polyol is 0.015 to 20.0% by weight based on the weight of the pigment particles as core particles, and the amount of the mixture thereof is 0.015 to 30.0% by weight based on the weight of the pigment particles as core particles, followed by filtering and drying, to form a lower coat comprising squaric acid, the polyol of formula (I) or a mixture thereof on at least a part of surface of the pigment particle; and thereafter (2) mixing the pigment particles with said lower coat formed thereon, with at least one alkylene glycol represented by the general formula (II):

$$C_qH_{2q}(OH)_2 \qquad (II)$$

wherein q is an integer of 2 to 10, wherein the amount of the alkylene glycol acid is 0.015 to 30.0% by weight based on the weight of the pigment particles as core particles, to form an upper coat comprising the alkylene glycol on at least a part of a surface of the obtained particle.

* * * * *